US009356988B2

(12) United States Patent
Shuman et al.

(10) Patent No.: US 9,356,988 B2
(45) Date of Patent: May 31, 2016

(54) INTERNET PROTOCOL COMMUNICATION ACCESSIBILITY IMPROVEMENT

(71) Applicant: QUALCOMM Incorporated, San Diego, CA (US)

(72) Inventors: Mohammed Ataur Rahman Shuman, San Diego, CA (US); Amit Goel, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 14/341,902

(22) Filed: Jul. 28, 2014

(65) Prior Publication Data

US 2015/0131650 A1 May 14, 2015

Related U.S. Application Data

(63) Continuation-in-part of application No. 14/077,543, filed on Nov. 12, 2013.

(51) Int. Cl.
*H04L 29/06* (2006.01)
*H04W 52/02* (2009.01)

(52) U.S. Cl.
CPC ............ *H04L 65/80* (2013.01); *H04L 65/1063* (2013.01); *H04L 65/1069* (2013.01); *H04W 52/0212* (2013.01); *H04W 52/0258* (2013.01)

(58) Field of Classification Search
CPC .................... H04Q 11/00; H04Q 2213/13332; H04Q 2213/13335; H04Q 2213/13248; H04Q 2213/13337; H04Q 2213/1324; H04Q 2213/13103; H04W 52/0219; H04W 4/10; H04W 76/005; H04W 76/046; H04M 2203/2044; H04M 3/56; H04M 3/42; H04M 3/42382
See application file for complete search history.

(56) References Cited

U.S. PATENT DOCUMENTS 6,765,896 B1 7/2004 Ahmed et al.
7,894,797 B2 2/2011 Ung et al.
(Continued)

FOREIGN PATENT DOCUMENTS

EP 2385734 A1 11/2011
EP 2393319 A1 12/2011

OTHER PUBLICATIONS

Imai N., et al., "A consolidated power saving architecture accommodating push-type applications for dual-mode devices", Computers and Communications (ISCC), 2010 IEEE Symposium On, IEEE, Piscataway, NJ, USA, Jun. 22, 2010, pp. 757-760, XP031731284, ISBN: 978-1-4244-7754-8 abstract paragraph [9901].

(Continued)

*Primary Examiner* — Jung-Jen Liu
(74) *Attorney, Agent, or Firm* — The Marbury Law Group, PLLC

(57) ABSTRACT

Methods, devices, non-transitory processor-readable instructions, and systems for a VOIP application server associated with a VOIP application to improve performance of a target computing device for IP communications via the VOIP application. An embodiment method may include determining whether the target computing device is likely to be called using the VOIP application during a contact period, and directing the target computing device to adjust a performance setting for receiving an IP communication in response to determining a likelihood the device will be called during the contact period. When a call is likely, the performance setting may be raised via transmitting dummy traffic to target computing device, activating a quality-of-service on an Rx interface corresponding to the VOIP application and the target computing device, and/or transmitting a message directing the target computing device to utilize an aggressive slot cycle index setting or an aggressive discontinuous reception setting.

26 Claims, 11 Drawing Sheets

(56) References Cited

U.S. PATENT DOCUMENTS

| | | | | |
|---|---|---|---|---|
| 2002/0172165 | A1* | 11/2002 | Rosen | H04M 3/42 370/310 |
| 2003/0017836 | A1 | 1/2003 | Vishwanathan et al. | |
| 2004/0087320 | A1* | 5/2004 | Kim | H04H 20/16 455/458 |
| 2005/0148348 | A1* | 7/2005 | Cramby | H04W 68/12 455/458 |
| 2005/0163104 | A1 | 7/2005 | Christensen et al. | |
| 2006/0013140 | A1* | 1/2006 | Pushparaj | H04M 3/42263 370/241 |
| 2008/0064398 | A1 | 3/2008 | Zhu | |
| 2008/0101268 | A1* | 5/2008 | Sammour | H04W 76/048 370/311 |
| 2008/0293437 | A1* | 11/2008 | Ranganathan | H04W 68/025 455/458 |
| 2009/0046627 | A1* | 2/2009 | Xu | H04W 72/1257 370/328 |
| 2009/0253470 | A1* | 10/2009 | Xu | H04W 76/048 455/574 |
| 2009/0262648 | A1* | 10/2009 | Chun | H04W 76/048 370/241 |
| 2010/0208660 | A1* | 8/2010 | Ji | H04W 52/0225 370/328 |
| 2011/0085654 | A1 | 4/2011 | Jana et al. | |
| 2012/0157098 | A1 | 6/2012 | Singh et al. | |
| 2014/0269366 | A1* | 9/2014 | Torgersrud | H04L 65/605 370/252 |
| 2015/0109908 | A1* | 4/2015 | Andrada | H04W 12/06 370/230 |
| 2015/0131648 | A1 | 5/2015 | Shuman et al. | |

OTHER PUBLICATIONS

International Search Report and Written Opinion—PCT/US2014/065062—ISA/EPO—Jan. 23, 2015.

Chun B.G., et al., "Mobius: unified messaging and data serving for mobile apps," MobiSys '12 Proceedings of the 10th international conference on Mobile systems, applications, and services, 2012, pp. 141-154.

Gouvas P.A., "Service Provision with automatic characteristics in mesh environments," Apr. 2011, 206 pages.

* cited by examiner

INTERNET PROTOCOL COMMUNICATION ACCESSIBILITY IMPROVEMENT

RELATED APPLICATIONS

The present application is a continuation-in-part of U.S. Non-Provisional application Ser. No. 14/077,543, entitled "Internet Protocol Communication Accessibility Improvement" filed Nov. 12, 2013, the entire contents of which are hereby incorporated by reference.

BACKGROUND

With the increase in networked communications, such as voice-over Internet protocol (VOIP) communications, users of Internet-capable devices have much greater flexibility in how they communicate with others. For example, mobile communication devices may be used instead of conventional circuit-switch telephones to make video and voice calls via wireless networks (e.g., WiFi LAN, cellular WAN network, etc.). Services for IP communications may utilize software (or "VOIP applications") that run on networking devices, such as Skype, OTT VOIP, VoLTE, and QChat, and that are configured to communicate with remote servers associated with the services. Such servers may store and maintain contact information for users, devices, and/or applications that utilize related IP communication services, such as IP addresses and registration states of computing devices executing QChat.

However, establishing IP communications on mobile computing devices presents problems that do not exist for conventional circuit-switch telephones as users may be unreachable (or inaccessible) for several reasons. In particular, IP communications (or calls) may be missed when VOIP applications are not actively executing (or in stand-by) on a user's computing device. VOIP applications may often be shutdown by automatic operations of a computing device's operating system (or App/Task manager routines) due to inactivity and/or resource constraints, and by users when they are not expecting or do not want to receive such a call. In certain cases (e.g., abrupt terminations), computing devices may not transmit de-registration information to service servers when terminating VOIP applications, which can cause the servers to have inaccurate registration states. Additionally, as many IP communications are conducted via mobile computing devices, IP addresses and registration states for the devices may change frequently with the movement of the mobile computing devices from one network access point to the next. For example, a smartphone computing device executing a VOIP application may utilize a new IP address when moving from a local area network (e.g., a WiFi hotspot) to a cellular network (e.g., an LTE network). With stale or otherwise invalid contact information (IP addresses), servers that establish and maintain IP calling services may not be able to successfully connect users.

SUMMARY

In various embodiments, a VOIP application server may be configured to perform operations for improving the accessibility of a target computing device configured to use IP communications software. The VOIP application server may be associated with a VOIP application, such as a multi-media application or QChat, that is used by the target computing device and caller computing devices to exchange calls over the Internet. An embodiment method for a VOIP application server associated with a VOIP application to improve performance of a target computing device for IP communications via the VOIP application may include determining whether the target computing device is likely to be called using the VOIP application during a contact period, and directing the target computing device to adjust a performance setting for receiving an IP communication with the VOIP application in response to determining a likelihood the target computing device will be called using the VOIP application during the contact period.

In some embodiments, directing the target computing device to adjust the performance setting for receiving the IP communication with the VOIP application may include directing the target computing device to raise the performance setting for receiving the IP communication with the VOIP application in response to determining that the target computing device is likely to be called using the VOIP application. In some embodiments, directing the target computing device to raise the performance setting for receiving the IP communication with the VOIP may include at least one of transmitting, by the VOIP application server via the VOIP application, dummy traffic to the target computing device, activating a quality-of-service (QoS) on receive ("Rx") interface corresponding to the VOIP application and the target computing device, and transmitting, by the VOIP application server via the VOIP application, a message directing the target computing device to utilize an aggressive slot cycle index (SCI) setting or an aggressive discontinuous reception ("DRX") setting.

In some embodiments, the method may also include determining whether an acknowledgement is received that indicates that the target computing device has adjusted the performance setting for receiving the IP communication with the VOIP application in response to the VOIP application server directing the target computing device to adjust the performance setting, and transmitting an out-of-band push notification message to the target computing device directing the target computing device to adjust the performance setting for receiving the IP communication with the VOIP application in response to determining that the acknowledgement was not received by the VOIP application server. In some embodiments, the acknowledgement may be a response message sent by the target computing device via the VOIP application. In some embodiments, transmitting the out-of-band push notification message to the target computing device directing the target computing device to adjust the performance setting for receiving the IP communication with the VOIP application may include transmitting the out-of-band push notification message with a payload that includes data indicating a quality-of-service, a slot cycle index setting, and/or a discontinuous reception setting.

In some embodiments, directing the target computing device to adjust the performance setting for receiving the IP communication with the VOIP application may include directing the target computing device to lower the performance setting for receiving the IP communication with the VOIP application in response to determining that the target computing device is not likely to be called using the VOIP application, and lowering the performance setting may include activating a default performance setting or a conservative performance setting for receiving the IP communication with the VOIP application. In some embodiments, directing the target computing device to lower the performance setting for receiving the IP communication with the VOIP application may include at least one of deactivating a quality-of-service on a receiver interface corresponding to the VOIP application and the target computing device, and transmitting, by the VOIP application server via the VOIP application, a message directing the target computing device to utilize a default quality-of-service, a default slot cycle index (SCI) setting, or a default discontinuous reception (DRX) setting.

Various embodiments may include a server configured with processor-executable instructions to perform operations of the methods described above. Various embodiments include a server having means for performing functions of the operations of the methods described above. Various embodiments include non-transitory server-readable medium on which are stored server-executable instructions configured to cause a server to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
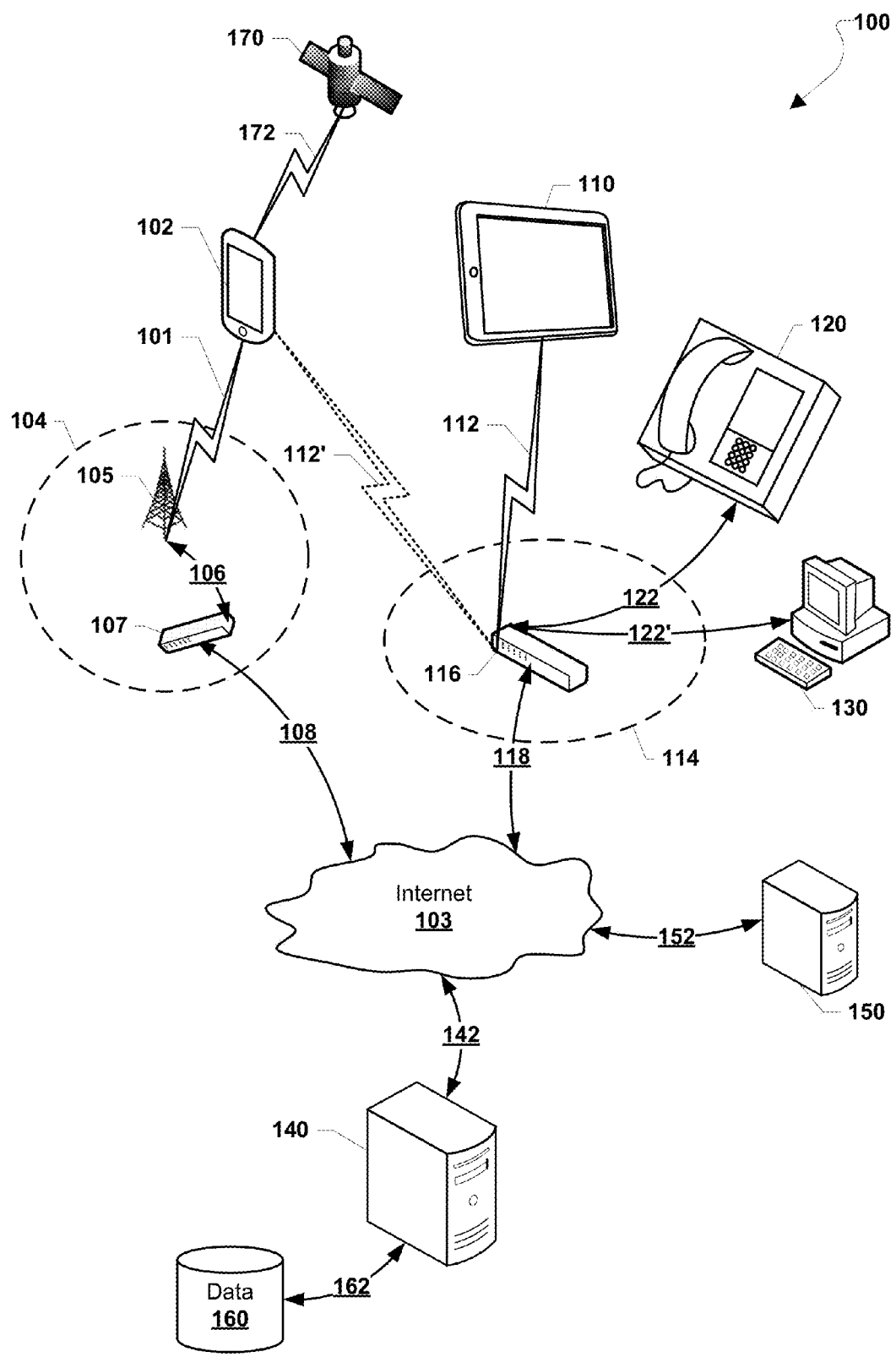
FIG. 1 is communication system diagram illustrating network components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any device having at least one processor configured to perform various software, routines, commands, and/or instructions. Computing devices may include desktop computers, VOIP application servers, and similar electronic devices. The terms "mobile computing device" or "mobile device" are used herein to refer to computing devices that include any one or all of cellular telephones, smartphones (e.g., iPhone), web-pads, tablet computers, Internet enabled cellular telephones, WiFi enabled electronic devices, personal data assistants (PDA's), laptop computers, personal computers, and similar electronic devices. In various embodiments, computing devices (including mobile computing devices) may be configured to connect with a local area network (LAN) (e.g., a WiFi hotspot connection) and/or a wide area network (WAN) (e.g., a connection to an LTE, 3 G or 4 G wireless wide area network) using wired or wireless connections (e.g., a wireless radio or transceiver, a wired connection to an Internet router, etc.).

The term "past usage information" is used herein to refer to any data related to activities, communications, and/or operating states experienced by computing devices configured to utilize a VOIP application. Past usage information may be collected, processed, and stored by a server (e.g., a VOIP application server), and may be based on data received (e.g., activity information) from devices using the VOIP application. Past usage information may further include historical data, trend information, and heuristics (or heuristics information) that may be generated by the server and/or received from other devices. For example, the server may aggregate, summarize, and otherwise generate past usage information that indicates the operations (e.g., applications launched, touch inputs received, GPS coordinates, etc.) and manner of use of VOIP applications (e.g., average time of IP calls, call participants, etc.) by various smartphones. Past usage information is further described below.

The various embodiments provide systems, devices, and methods for leveraging information accessible to a server to improve the accessibility and/or performance of computing devices for receiving IP communications via a VOIP application. In various embodiments, a server (referred to as a "VOIP application server") may be associated with the VOIP application and may evaluate data describing the activities of a target computing device (i.e., a computing device receiving IP communications) and caller computing devices (i.e., computing devices initiating IP communications with the target computing device) to identify whether actions need to be taken to ensure the target computing device is accessible for likely incoming calls via the VOIP application. The VOIP application server may utilize past usage information and/or pinging messaging to proactively keep the target computing device's registration information current, as well as keep IP communications software active/running on the target computing device.

For example, prior to a time of day that is determined to be historically very active for the target computing device to receive IP communications via the VOIP application, the VOIP application server may be configured to transmit "are you there" pings and/or commands that wake-up the VOIP application (e.g., QChat) on the target computing device. As another example, based on previous calling trends and/or a current location coinciding with a low number of previous calls, the VOIP application server may determine that a target computing device is not likely to receive an IP communication and, thus may not transmit pings to request registration updates from the target computing device.

The VOIP application server may calculate a likelihood (or likelihood value) that the target computing device will be contacted or called within a contact period. The likelihood may be calculated using various functions, algorithms, and predictive logic that use past usage information (e.g., heuristics and other stored activity information) related to the target computing device and/or caller computing devices. The VOIP application server may process historical data associated with the target computing device to identify trends that indicate the likelihood of an incoming IP communication. For example, the VOIP application server may process call logs associated with the VOIP application to detect patterns and relationships between the target computing device's call activity and various factors, such as time of day, day of week, location (e.g., GPS coordinates), activity of applications or software on the target computing device (e.g., whether other apps are loaded or terminated, interaction with a user interface, etc.). The VOIP application server may examine calling logs and trends to identify busy times for the target computing device receiving calls (e.g., everyday between 9 AM-10 AM, etc.) and/or the busiest location for receiving calls (e.g., at work, in a certain part of town, etc.).

In an embodiment, the VOIP application server may also evaluate information related to caller computing devices to determine the likelihood of an IP communication (or IP call) to the target computing device. In particular, the VOIP application server may use past usage information (e.g., heuristics, trending information) related to caller computing devices. For example, the VOIP application server may identify that a certain caller computing device (e.g., the smartphone of the spouse of the owner of the target computing device) typically calls the target computing device via the VOIP application when the caller computing device begins moving in a certain direction/manner (e.g., on a highway out of downtown) at a certain time of day (e.g., quitting time). In an embodiment, the VOIP application server may process the activity information and past usage information associated with contacts indicated within the target computing device's VOIP application address book to determine the likelihood the target computing device will be called by these contacts.

In another embodiment, the VOIP application server may also receive and use data from the VOIP application executing on a caller computing device that may indicate that the user may be preparing to call a target computing device, such as whether the user of the caller computing device is looking at or looking up a contacts database file of the target computing device, has issued a voice command to call the target computing device, or has entered some or all digits of the telephone number of the target computing device. For example, the VOIP application on the caller computing device may transmit a status message to the VOIP application server indicating that the caller has opened a contact address book within the VOIP application and is looking at the target computing device's contact information or performing another action corresponding to the target computing device (e.g., executing a database search for the target computing device's contact number). In another embodiment, the VOIP application server may determine the likelihood of a caller computing device calling the target computing device based on calendar or schedule information reported to the VOIP application server, such as scheduled call items/notes (e.g., "Call Joe at 3!") stored within the VOIP application of a caller computing device or target computing device.

Activity information, as well as other data related to the use of the target and/or caller computing devices, may be transmitted to the VOIP application server via various messaging techniques. For example, user interface information and/or location information may not be sent to the VOIP application server by the target computing device and/or caller computing devices via dedicated signaling, but instead may use opportunistic messaging to report such activity information as metadata or other information within other messages received by the VOIP application server. In various embodiments, activity information (e.g., GPS coordinates, etc.) of caller computing devices and/or target computing devices may be transmitted to the VOIP application server as out-of-band messages, such as data transmitted to the VOIP application server via SMS messages, emails, and/or signals related to any system-level services of the devices. For example, the operating system on the target computing device may be configured to transmit messages to the VOIP application server that indicate current GPS coordinates, router identification, and/or service set identification (SSID) information of a nearby network access point. In another embodiment, the VOIP application on the target computing device may be configured to periodically transmit information indicating the target computing device's activity. For example, while active on the target computing device, the VOIP application may transmit calendar information, GPS coordinates, and sensor data (e.g., accelerometer sensor data, etc.).

Based on whether an IP communication (or IP call) is determined to be likely during a contact period, the VOIP application server may perform operations to proactively, selectively, and efficiently ensure the target computing device is dynamically tuned for high performance, quality, and low latency for receiving the IP communication. In general, conventional performance optimization techniques for mobile devices may be activated (or turned "on") all the time and/or during a predetermined period (e.g., a time-out based approach). However, power and network resources may be used needlessly when mobile devices are configured for high performance with regard to the VOIP application but there are no calls to be handled during a period. For example, aggressive slot index cycle (SCI) settings or aggressive discontinuous reception (DRX) settings may be power intensive, causing the target computing device to needlessly drain the battery checking for communications regardless of whether communications are present (or are likely to occur). As another example, QoS reservation and particular UMTS and LTE traffic profiles/classes (i.e., QoS class indicators (QCI)) may cause unnecessary resource use when a mobile device is not handling a VOIP call. Predictive or proactive techniques may be valuable in providing improved use of network resources (e.g., receiver interface (or Rx interface) optimizations, etc.), computation resources, and/or battery resources.

To address such issues, in some embodiments the VOIP application server may be configured to proactively cause the target computing device to adjust (i.e., raise or lower) performance settings for receiving IP communications via the VOIP application based on a determined likelihood that such communications will occur. For example, based on a determined likelihood of an incoming call, the VOIP application server may cause the target computing device to negotiate a higher (or lower) paging cycle (e.g., SCI setting, DRX setting) and/or negotiate a quality-of-service (QoS) setup on an RX interface used to transmit various information between devices and the VOIP application server (e.g., policy data, charging data, etc.). In other words, the VOIP application server may cause the target computing device to prepare to operate with high performance (or more aggressive performance) settings for a radio access technology when VOIP communications are likely to occur in order to better handle a potential call in a fast and efficient manner. Similarly, the VOIP application server may cause the target computing device to prepare to operate with low or conservative performance (or lowered performance) settings when VOIP communications are not likely to occur. In some embodiments, the VOIP application server may cause the target computing device to operate with various performance settings by configuring quality of service reservation, latency, traffic classification and prioritization, and/or guaranteed bit rate parameters.

In some embodiments, the VOIP application server may cause the target computing device to implement various predictive optimizations (i.e., optimizations to the VOIP application) based on the likelihood of a target computing device being called by another party, as well as the radio access technology (RAT) being utilized by the target computing device, such as Long Term Evolution (LTE), Evolution-Data Optimized (EVDO), Universal Mobile Telecommunications System (UMTS), etc. For example, in response to determining that the target computing device is likely to be called within a define future period, the VOIP application server may set up a quality-of-service (QoS) on an Rx interface, transmit a message to direct the target computing device to negotiate a certain QoS for enhanced latency and performance, send dummy traffic to the target computing device to bring up a traffic channel, and/or transmit a message to direct the target computing device to negotiate aggressive slot cycle index (SCI) settings (e.g., for 1x CDMA or EVDO networks) or aggressive discontinuous reception (DRX) settings (e.g., for LTE networks, etc.).

In some embodiments, the VOIP application server may transmit an out-of-band push notification message to the target computing device to cause an adjustment to the performance of the target computing device. For example, the VOIP application server may send an out-of-band message that indicates a time duration and/or frequency that the target computing device may perform operations for improving (or raising) its performance capabilities for receiving calls via the VOIP application. In some embodiments, such improved receiving capabilities may be based on the likelihood that a call will be sent to the target computing device (i.e., the target computing device may be configured as a function of the probability that it will receive a call).

As such improvements to the performance of the target computing device may be affected only when an incoming call to the target computing device is likely, the VOIP application server may cause the target computing device to return to default configurations (e.g., default SCI/DRX settings, etc.) when IP communications are not likely to occur. In other words, the VOIP application server may reverse or lower the performance setting adjustments to the target computing device when the likelihood of the target computing device being called decreases. For example, the VOIP application server may cause a target computing device to reduce a high performance configuration (e.g., a high SCI setting) to a more conservative setting (e.g., a lower SCI setting). In some embodiments, the VOIP application server may cause the target computing device to activate a predefined conservative or default configuration or performance setting when a call is not likely to be received.

In some embodiments, the VOIP application server may identify different modalities or combinations of various configurations or settings (e.g., SCI, DRX, and/or QoS settings) as a function of a calculated likelihood that a call may occur. For example, the VOIP application may determine different values for each of the SCI settings, DRX settings, and/or QoS that may be implemented at the target computing device to best accommodate different likelihoods of the call occurring.

Such combinations may be predefined and stored on the VOIP application server or alternatively provisioned on the target computing device, such as within a local database, etc. For example, the VOIP application server may indicate a selection of a particular combination of performance settings that should be implemented at the target computing device by transmitting a message specifying the corresponding index of a data table that is associated with that particular combination. In some embodiments, the VOIP application server may be configured to transmit the identifier for a configuration (e.g., conservative-performance configuration, high-performance configuration, medium-performance configuration, etc.) that may include individual values for different settings or parameters (e.g., one value for an SCI setting, a different value for a DRX setting, etc.) and that may be implemented by the target computing device in response to receiving the identifier.

In some embodiments, the VOIP application server may be configured to perform operations to direct a plurality of target computing devices to raise (or lower) performance settings for receiving communications with the VOIP application based on the likelihood that there will be a group call to the plurality of devices. For example, in response to determining that a group call via the VOIP application is likely to occur within a period, the VOIP application server may direct each of the devices that may be involved in the likely group call to proactively raise performance settings for the group call, such as by changing SCI or DRX settings.

With such embodiment techniques, the VOIP application server may proactively ensure that performance links (e.g., QoS) are of a high performance and/or quality for conducting likely communications via the VOIP application, without doing so needlessly. Further, the embodiment techniques performed by the VOIP application server may result in shorter time delays between registrations of target computing devices, as these client devices may register more frequently when the likelihood of being called is greater without needless impact to the battery endurance of client computing devices.

In some embodiments, when an IP communication (or IP call) is determined to be likely during a contact period, the VOIP application server may calculate a confidence interval or value that indicates the probability that the target computing device will be accessible during the contact period. For example, a confidence value exceeding a threshold value may mean the target computing device is accessible. The confidence value may indicate whether the IP address and/or other registration state for the VOIP application on the target computing device's IP address is current (or accurate). The VOIP application server may utilize a confidence function, algorithm, rule set, or other logic that may utilize the target computing device's recent activities to determine whether the registration state is still current. For example, the VOIP application server may determine that because the target computing device just ended an IP communication with the VOIP application, the registration state has a high confidence level. As another example, when the target computing device has not been involved in an IP communication with the VOIP application for a long time, the VOIP application server may determine that a stored registration state for the target computing device is stale (or inaccurate), and thus have low confidence in its accessibility.

In an embodiment, the VOIP application server may utilize various factors to adjust, affect, or weight the confidence calculations, such as the device type of the target computing device. For example, when the target computing device is a smartphone computing device, the target computing device may often move from access point to access point, and thus the confidence in its accessibility may be low. As another example, when the target computing device is a fixed device (e.g., a desktop computer), the VOIP application server may calculate a high confidence in its accessibility, as fixed devices typically stay connected via the same network connection/LAN. In an embodiment, a tablet computing device may be calculated as having a higher confidence value regarding its accessibility than a smartphone computing device, and a desktop may have a higher confidence value regarding its accessibility than any mobile computing device. In another embodiment, the VOIP application server may determine whether a stored IP address (or registration state) is current based on location information and/or past usage information. For example, using historical location trends, the VOIP application server may determine that at a given time on a certain day of the week, the target computing device has likely moved to a new WiFi spot and thus the VOIP application server stored IP address is no longer accurate, and thus has a low confidence value regarding its accessibility.

In various embodiments, the VOIP application server may utilize other information to adjust, affect, or weight the calculation of the confidence value regarding its accessibility. In particular, the VOIP application server may utilize data, such as Outlook data, online account data (e.g., Gmail, Facebook, Google+status info, etc.), and/or calendar information, received from the target computing device via out-of-band messaging (e.g., system-level communications, etc.) and/or VOIP application messaging. For example, the VOIP application server may receive calendar data saved on the target computing device that indicates meetings the target computing device is scheduled to participate in (e.g., a phone conference). The VOIP application server may process such data to identify factors that may increase or decrease the target computing device's probability of being accessible during the contact period. For example, when the calendar indicates that the user of the target computing device has a meeting at work with his/her boss, the VOIP application server may determine that the meeting will not likely be cancelled and thus may calculate a low confidence for accessibility, as the user of the target computing device will not be able to answer an IP communication at the meeting time. In another embodiment, the VOIP application server may utilize sensor data, such as accelerometer data transmitted to the VOIP application server, such as via out-of-band messaging, to determine whether the target computing device is being carried by its user and is therefore accessible.

Based on the likelihood and confidence calculations, the VOIP application server may proactively transmit messages (or ping) the target computing device to ensure the target computing device is accessible via the VOIP application. The VOIP application server may first transmit messages via the VOIP application (or "in-band" messages), requesting that the target computing device respond with status information, such as a confirmation of the registration state. For example, the VOIP application server may transmit a ping to the target computing device using a session initiation protocol (SIP) or proprietary "are you there" (or AYT) ping message. If no response is received, the VOIP application server may then transmit out-of-band messages to the target computing device, such as push notifications (e.g., Android Cloud to Device Messaging or Apple Push Notification). Such push notifications may trigger the target computing device to execute various actions, such as transmitting response messages that re-initiate (or refresh) registration with the VOIP application and/or load/execute the VOIP application when terminated. In an embodiment, the push notifications may trigger the target computing device to transmit its latest IP address, location information, and/or increase/decrease the time delay for subsequent registrations of the VOIP application with the VOIP application server.

In an embodiment, the VOIP application server may perform different operations based on the subscription tier or type of the target computing device. For example, the VOIP application server may calculate likelihood and/or confidence values using more/less information and/or may perform more/less push notifications based on the target computing device's account status with the service associated with the VOIP application server. As another example, the VOIP application server may transmit more messages to ensure the VOIP application is running when an emergency call is determined to be likely (e.g., the target computing device typically goes through a dangerous part of town at a certain time of day, etc.).

Some embodiments may be beneficial in that they may increase the success rate of IP communications. For example, by pinging target computing devices prior to times when the devices have historically experienced many incoming calls, a VOIP application server may help avoid missed calls due to out-of-date registrations or inactive VOIP applications. Further, the various embodiments may be beneficial in reducing the load on communication systems and VOIP application servers. For example, instead of requiring target computing devices to always provide status information register, the VOIP application server may only trigger registrations of the devices when the devices are likely to be contacted (e.g., prior to receiving a regularly occurring VOIP call) and when the devices are probably not reachable (e.g., registrations have gone stale due to network access point hopping). By evaluating target computing device activities ahead of time, missed calls and registration operations may be minimized.

FIG. 1 illustrates an exemplary communication system 100 that may be used in various embodiments. The communication system 100 may include a VOIP application server 140 configured to process and maintain communications associated with an Internet protocol (IP) communications software (or VOIP application). For example, the VOIP application server 140 may be a server that receives and relays two-way messaging between computing devices executing a QChat application. In various embodiments, the IP communications software may be applications, apps, routines, and other operations configured to establish IP communications between various devices. The VOIP application server 140 may transmit and receive various communications over the Internet 103 via a wired or wireless connection 142.

The VOIP application server 140 may include a plurality of components, blades, or other modules to process and store data associated with the IP communications software (or VOIP application). In an embodiment, the VOIP application server 140 may be configured to utilize various storage devices, such as a database unit 160 in communication with the VOIP application server 140 via a wired or wireless connection 162. For example, the VOIP application server 140 may transmit past usage information (e.g., aggregated data and/or heuristics information) to the database unit 160 for storage. In an embodiment, the database unit 160 may be a component within the VOIP application server 140. In an embodiment, the VOIP application server 140 may store within the database unit 160 various data related to the IP communications software, such as location information (e.g., GPS coordinates), IP addresses, SSID information, registration information, and sensor data (e.g., accelerometer sensor data, etc.), in relation to user profiles. Such user profiles may also include other information relevant to the user profiles, such as user names, passwords, authentication information, contact information (e.g., email addresses, phone numbers, etc.), and information describing associated devices (e.g., device type).

The communication system 100 may also include various mobile computing devices configured to participate in Internet protocol communications, such as a smartphone computing device 102 and a tablet computing device 110. For example, the smartphone computing device 102 and the tablet computing device 110 may include processors configured to execute the IP communications software associated with the VOIP application server 140. The computing devices 102, 110 may utilize various transceivers and antennas to transmit and/or receive wireless signals. In particular, the smartphone computing device 102 may be configured to exchange long-range wireless signals 101 with a cellular tower 105 (or base station) associated with a cellular network 104 (e.g., a 3 G, 4 G, LTE cellular wide area network (WAN)). The cellular network 104 may include various devices, such as a network operations center 107 coupled to the cellular tower 105 by a wired or wireless connection 106. The network operations center 107 may manage voice calls and data traffic through the cellular network 104, and typically may include or may be connected to one or more servers (not shown). The cellular network 104 may provide a connection 108 to the Internet 103.

In an embodiment, the smartphone computing device 102 may include components for use with a global positioning system (GPS). For example, the smartphone computing device 102 may include a GPS transceiver/radio configured to receive signals 172 from a GPS satellite 170 in orbit overhead. In an embodiment, the smartphone computing device 102 may obtain location information (e.g., GPS coordinates) from such signals 172 and/or from assisted-GPS (AGPS) techniques.

The tablet computing device 110 may exchange wireless signals 112 with a wireless router 116 (e.g., a WiFi router) within a local area network 114, such as a WiFi local area network (LAN). The local area network 114 may provide a connection 118 to the Internet 103. In an embodiment, the local area network 114 may include an Internet access server (not shown) connected to the wireless router 116. In an embodiment, the smartphone computing device 102 may also communicate with the local area network 114 via wireless signals 112' to the wireless router 116.

In various embodiments, the computing devices 102, 110 may be configured to exchange various wireless signals according to any of a variety of communication protocols, such as Wi-Fi, WiFi Direct, infrared wireless, induction wireless, ultra-wideband (UWB), wireless universal serial bus (USB), Bluetooth, Bluetooth Low Energy, Zigbee, Peanut, or other wireless technologies or protocols. However, the scope of the claims should not be limited to any particular wireless protocol unless specifically recited in the claims.

The communication system 100 may also include other devices configured to execute the IP communications software or otherwise participate in Internet protocol communications. For example, an IP phone device 120 may be connected to the Internet 103 via wired or wireless connections 122 to the wireless router 116 associated with the local area network 114. As another example, a stationary computing device 130, such as a desktop computer terminal at home or work, may also be connected to the Internet 103 via wired or wireless connections 122' to the wireless router 116 associated with the local area network 114. When executing IP communications software (or the VOIP application), any of the devices 102, 110, 120, 130 may be capable of participating in IP communications, such as IP calls routed through the VOIP application server 140.

In an embodiment, the communication system 100 may also include a third-party server 150, such as an exchange server or other computing device configured to maintain information related to third-party services. For example, the third-party server 150 may be associated with social media (or social networking) websites, email services, and/or cloud computing storage services. The third-party server 150 may communicate with other devices, such as the smartphone computing device 102 and/or the VOIP application server 140, over the Internet 103 via a wired or wireless connection 152. For example, in response to receiving a request message, the third-party server 150 may transmit to the VOIP application server 140 locally-stored activity information (e.g., location information, social media status update messages, IP address, etc.) related to the computing devices 102, 110.

Figure 2A:
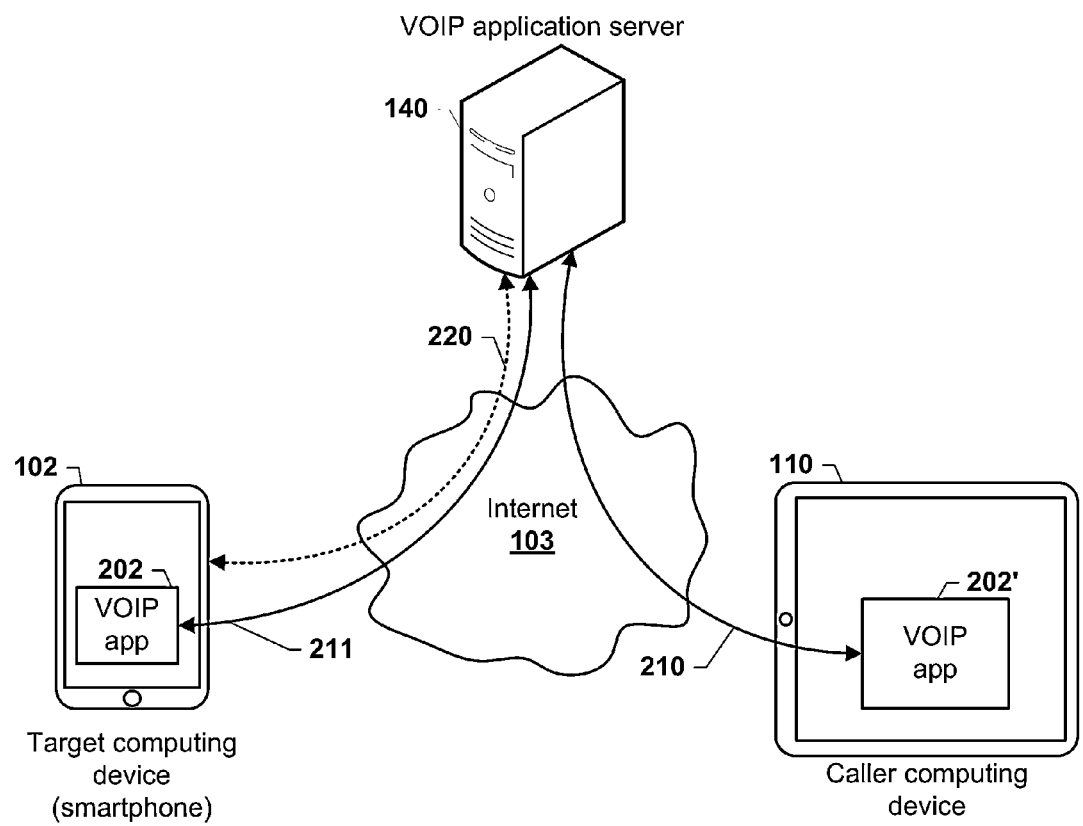
FIG. 2A is communication system diagram illustrating various messaging between a smartphone computing device, a tablet computing device, and a VOIP application server associated with an Internet protocol (IP) calling application.

FIG. 2A illustrates various messages that may be exchanged between a smartphone computing device 102, a tablet computing device 110, and a VOIP application server 140 associated with an Internet protocol (IP) communications software (or VOIP application) according to an embodiment. As described above, IP communications (or IP calls) may be transmitted over the Internet 103 by the computing devices 102, 110 executing a VOIP application 202, 202' such as QChat. The tablet computing device 110 (referred to in FIG. 2A as the "caller" computing device) may transmit signals 210 associated with the VOIP application 202' to the VOIP application server 140 for processing and routing to the smartphone computing device 102 (referred to in FIG. 2A as the "target" computing device) via signals 211 associated with the VOIP application 202, and vice versa. For example, the VOIP application server 140 may receive signals 210, 211 from both the smartphone computing device 102 and a tablet computing device 110 for delivery to the other during an IP communication session.

However, without an active or executing VOIP application 202, 202', the computing devices 102, 110 may not be able to exchange the signals 210, 211 associated with the VOIP application 202, 202'. For example, the smartphone computing device 102 may not participate in an IP communication using QChat when the smartphone computing device 102 has closed/terminated the QChat software or when the VOIP application server 140 no longer has access to the current IP address of the smartphone computing device 102.

To address this situation, in an embodiment the VOIP application server 140 and smartphone computing device 102 may utilize out-of-band transmissions 220 (or out-of-band messaging) to exchange information for establishing subsequent IP communications for the VOIP application 202. For example, the VOIP application server 140 may transmit via the out-of-band transmissions 220 a command, software, or executable script that may cause the smartphone computing device 102 to resume execution of the VOIP application 202. As another example, the out-of-band transmissions 220 may include a request for the smartphone computing device 102 to re-register the VOIP application 202 and/or transmit to the VOIP application server 140 current location information (e.g., GPS coordinates, IP address, service set identification (SSID), etc.) via the signals 211 and/or the out-of-band transmissions 220. As described above, the out-of-band transmissions 220 may include signals having a format that is different from signals 211 associated with the VOIP application 202 or alternatively may be communications that utilize software separate from the VOIP application 202. For example, the out-of-band transmissions 220 may be push notifications used by particular services (e.g., Apple Push Notifications, etc.).

Figure 2B:
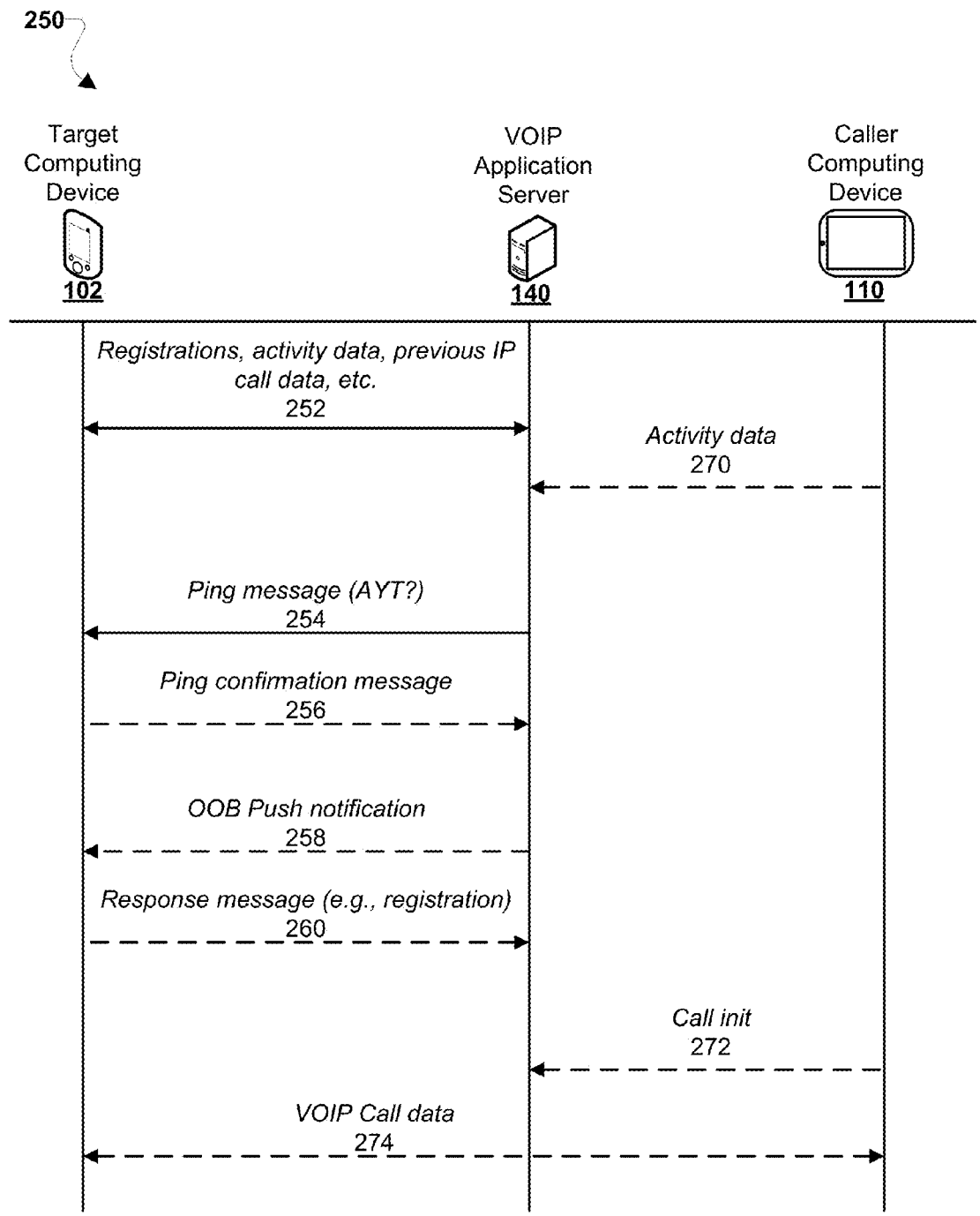
FIG. 2B is a call flow diagram illustrating communications between a VOIP application server and a target computing device suitable for use with various embodiments.

FIG. 2B illustrates a call flow diagram 250 of communications between a VOIP application server 140, a target computing device 102, and a caller computing device 110 according to an embodiment. The target computing device 102 and caller computing device 110 may utilize a VOIP application and may otherwise be registered with the VOIP application server 140. For example, the target computing device 102 may have installed a QChat application that utilizes IP communications supported by the VOIP application server 140. The target computing device 102 and the VOIP application server 140 may exchange messages 252 including various activity data, such as previous registrations (e.g., IP address reports from the target computing device 102, etc.) and IP call data (e.g., previous call data with other devices via the VOIP application, etc.). In an embodiment, the activity information of the messages 252 may be transmitted to the VOIP application server 140 via opportunistic messaging, proprietary messaging via the VOIP application, emails, SMS text messages, etc.

Periodically (e.g., upon expiration of a predefined interval) or alternatively in response to determining that an incoming call is likely to occur within a period, the VOIP application server 140 may transmit a ping message 254 (e.g., an "are you there?" or "AYT?" message) to the target computing device 102. The ping message 254 may be formatted according to the VOIP application, such as a proprietary message that is processed and responded to using services associated with the VOIP application on the target computing device 102. In an embodiment, the ping message 254 may be transmitted in response to the VOIP application server 140 receiving an optional message 270 with activity data from the caller computing device 110. For example, the activity data may indicate the user of the caller computing device 110 has clicked on contact information related to the target computing device 102 within the VOIP application (e.g., clicked on an address book entry associated with the target computing device 102 within QChat, etc.). The optional message 270 may be transmitted via the VOIP application executing on the caller computing device 110, or alternatively via opportunistic messaging, email, SMS text message, etc.

When registration information associated with the target computing device 102 that is stored by the VOIP application server 140 is up-to-date and the target computing device 102 is available to use the VOIP application (e.g., the VOIP application is loaded on the target computing device), the target computing device 102 may receive the ping message 254, and in response may transmit a ping confirmation message 256 using the VOIP application. Such a ping confirmation message 256 may include updated registration information.

In an embodiment, the ping confirmation message 256 may also include status information describing the current characteristics, operating states, and other information about conditions or activities of the target computing device 102. For example, the ping confirmation message 256 may include data indicating whether the target computing device 102 is low on power or is connected to a power supply. In an embodiment, the ping confirmation message 256 may include information indicating whether the user of the target computing device 102 has launched an application or entered input data relevant to IP call accessibility. For example, the ping confirmation message 256 may include an indicator that the user of the target computing device 102 has entered trip data into a GPS application for a car ride or added a meeting entry to his digital calendar client program. In a further embodiment, the ping confirmation message 256 may include other information that may be useful in determining the likelihood that the target computing device will be accessible in the near future, such as calendar information (e.g., meetings or commitments scheduled for the next few minutes or hours), location information, etc.

When the target computing device 102 is unreachable, inaccessible, or otherwise unable to transmit the ping confirmation message 256 using the VOIP application, the VOIP application server 140 may be configured to transmit an out-of-band push notification 258 (referred to as "OOB Push notification" in FIG. 2B) to the target computing device 102. For example, the VOIP application server 140 may transmit the out-of-band push notification 258 as a message formatted for receipt/processing by Android or iOS operating system services. The out-of-band push notification 258 may include various data, flags, commands, scripts, indicators, and/or information that may be designed to wake-up the VOIP application and otherwise cause the target computing device 102 to register (or update a registration) with the VOIP application server 140. For example, the out-of-band push notification 258 may request status information from the target computing device 102 via the VOIP application and/or may include a command for the target computing device 102 to execute the VOIP application and/or a request for the target computing device 102 to refresh a registration for the VOIP application. The out-of-band push notification 258 may be transmitted in response to the expiration of a predefined period from the transmission of the ping message 254 (e.g., a number of milliseconds, seconds, minutes, etc.). In an embodiment, the out-of-band push notification 258 may include the same information or requests as the ping message 254 but may be transmitted by the VOIP application server 140 in a different format or protocol.

In response to receiving the out-of-band push notification 258, the target computing device 102 may transmit a response message 260 that may include registration information. In an embodiment, the target computing device 102 may launch the VOIP application or bring the VOIP application to the foreground in response to receiving the out-of-band push notification 258.

The caller computing device 110 may transmit an optional call initiation message 272 (referred to as a "call init" message) to the VOIP application server 140, which in response, may perform operations to establish an IP communication and relay IP call data 274 between the caller computing device 110 and the target computing device 102. For example, the VOIP application server 140 may use registration information transmitted via the response message 260 to establish a QChat session between the caller computing device 110 and the target computing device 102.

Figure 3:
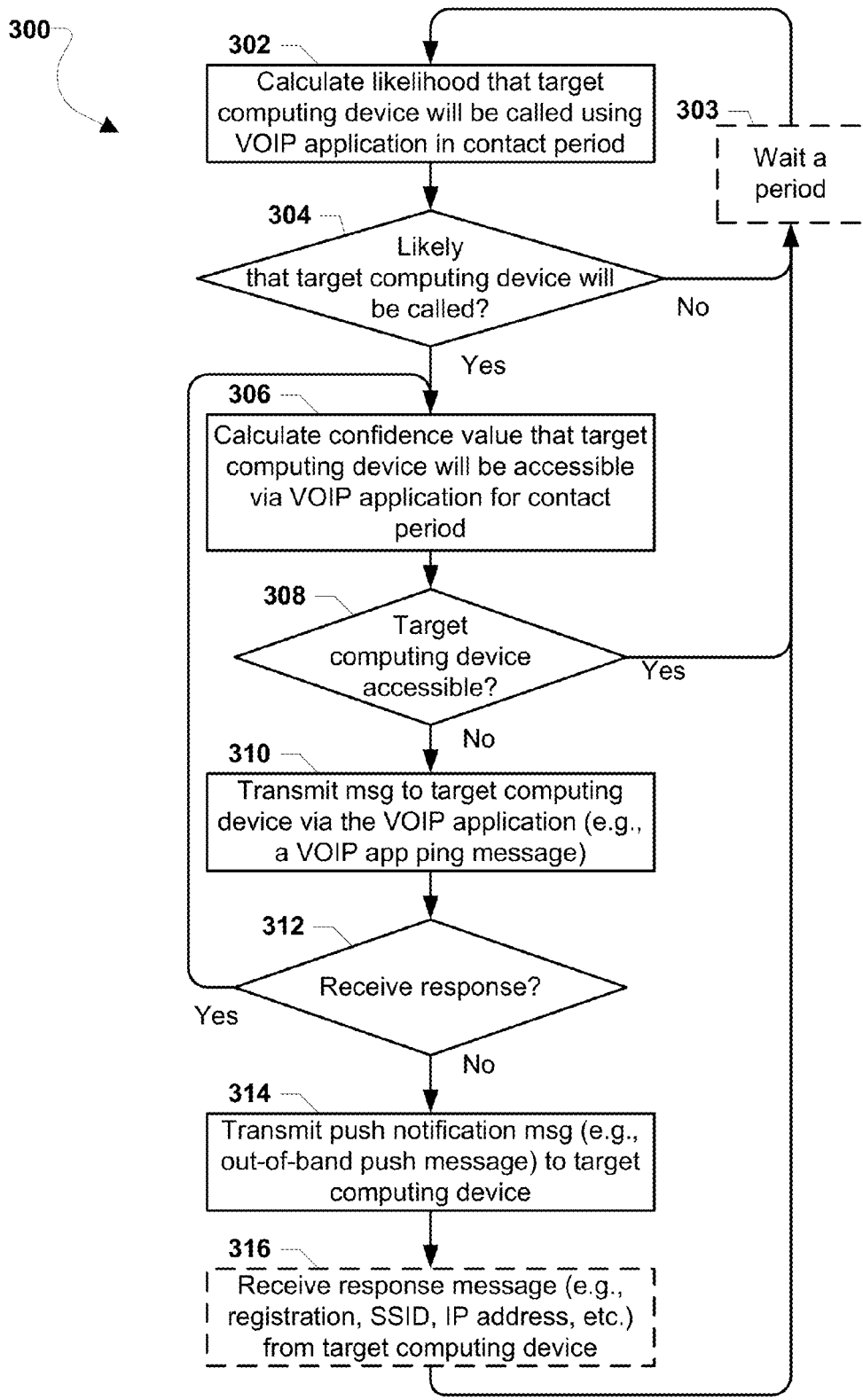
FIG. 3 is a process flow diagram illustrating an embodiment method for a VOIP application server improving Internet protocol communication accessibility for a target computing device using IP communications software.

FIG. 3 illustrates an embodiment method 300 for a VOIP application server improving Internet protocol communication accessibility for a target computing device using IP communications software (or a VOIP application). In various embodiments, the VOIP application server may be configured to perform the method 300 periodically for all computing devices registered to use the VOIP application. For example, the VOIP application server may perform the method 300 every few seconds, minutes, hours, days, etc. for each computing device that has installed an associated VOIP application. Alternatively, the VOIP application server may be configured to perform the method 300 for certain computing devices registered with the VOIP application, such as smartphone computing devices that have recently experienced missed IP communications. In another embodiment, the VOIP application server may be configured to perform the method 300 for particular computing devices on a periodicity that is based on information stored in associated with user profiles for registered devices or users. For example, based on the priority or ranking of profiles associated with registered devices, the VOIP application server may perform the method 300 for a first registered device at a first frequency (e.g., every minute) and may perform the method 300 for a second registered device at a second frequency (e.g., every day).

In block 302, the VOIP application server may calculate the likelihood that the target computing device will be called using the VOIP application in a contact period. For example, the VOIP application server may evaluate past usage information (e.g., heuristic information) stored on the VOIP application server over a certain period of time (e.g., the preceding week, month, year, etc.) to identify whether the contact period coincides with times the target computing device typically receives a call (e.g., a scheduled weekly call to a relative, a business touch-base conference, etc.). In various embodiments, the contact period may be a predefined future time window, such as a next few seconds, minutes, hours, days, etc. In various embodiments, the contact period may be adjusted by the VOIP application server based on stored information, heuristics data, and other data related to the previous activities of the target computing device. For example, when the VOIP application server knows that the VOIP application is typically left active on the target computing device throughout a Saturday, the VOIP application server may set the contact period for an entire day, etc. In an embodiment, the likelihood may simply be calculated as a Boolean value (e.g., 'yes' or 'no', etc.).

In determination block 304, the VOIP application server may determine whether it is likely that the target computing device will be called during the contact period based on the calculated likelihood. For example, the VOIP application server may compare the calculated likelihood to a predefined threshold value. If the VOIP application server determines that the target computing device is not likely to be called (i.e., determination block 304="No"), in optional block 303 the VOIP application server may wait a period (e.g., seconds, minutes, etc.) before repeating the operations of calculating the likelihood that the target computing device will be called using the VOIP application in a contact period in block 302.

If the VOIP application server determines that the target computing device is likely to be called (i.e., determination block 304="Yes"), in block 306 the VOIP application server may calculate a confidence value that the target computing device will be accessible via the VOIP application during the contact period. For example, the VOIP application server may calculate a value that indicates the probability that the target computing device is executing (or will be executing) the VOIP application during the contact period. As another example, the VOIP application server may calculate a value that indicates the probability that the VOIP application server has current or valid registration information for the target computing device. As described above, the VOIP application server may utilize various factors in calculating the confidence value regarding target computing device availability, such as whether the target computing device is a smartphone computing device or a tablet computing device and/or how many different locations the target computing device has been within over a certain period (e.g., based on reported GPS coordinates, etc.). In determination block 308, the VOIP application server may determine whether the target computing device is accessible (i.e., whether there is confidence in the accessibility of the target computing device) based on the calculated confidence value regarding its accessibility. For example, the VOIP application server may determine there is no confidence in the target computing device's accessibility for the contact period when the calculated availability confidence value is below a predefined threshold value. If the VOIP application server determines that there is high confidence that the target computing device is accessible (i.e., determination block 308="Yes"), the VOIP application server may wait a period in optional block 303 before repeating the operations of calculating the likelihood that the target computing device will be called using the VOIP application in a contact period in block 302.

If the VOIP application server determines that there is little or no confidence that the target computing device is accessible (i.e., determination block 308="No"), in block 310 the VOIP application server may transmit a message to the target computing device via the VOIP application, such as a message that requests status information. For example, the transmitted message may be a ping message via QChat that pings the target computing device's QChat client to see whether the client is active (e.g., an "are you there?" message/ping). The transmitted message to the target computing device via the VOIP application may be formatted in a proprietary manner related to the VOIP application, such as an in-app message or notification. In determination block 312, the VOIP application server may determine whether a response message is received from the target computing device, such as an automatic confirmation from the VOIP application or a manual confirmation from the target computing device. If a response message is received (i.e., determination block 312="Yes"), the VOIP application server may recalculate the confidence value in block 306 based on the response received from the target computing device. In an optional embodiment, the VOIP application server may be configured to wait a period in optional block 303 and repeat the operations of calculating the likelihood that the target computing device will be called in a contact period in block 302 when a response message is received, as the receipt of this message indicates that the target computing device is currently accessible.

If no response message is received (i.e., determination block 312="No"), in block 314 the VOIP application server may transmit a push notification message to the target computing device, such as an out-of-band push notification message using an available messaging protocol separate from the VOIP application. The target computing device may not need to be actively executing the VOIP application in order to receive and respond to the push notification message from the VOIP application server. The push notification message may request an up-to-date IP address and/or location information from the target computing device. In an embodiment, the push notification message may include a script, routine, instruction, or software code commanding the target computing device to begin executing the VOIP application, register a current IP address, etc. For example, the push notification message may include a command for the target computing device to load/execute the VOIP application and/or instructions that direct the target computing device to refresh a registration. In an embodiment, the message transmitted with the operations in blocks 310 and 314 may include the same or similar information (e.g., requests, commands, etc.) related to the target computing device, but may be structured in a different format or protocol and thus may be accessible by the target computing device using different software.

In optional block 316, the VOIP application server may receive a response message from the target computing device, such as a registration message related to the VOIP application, an email, an SMS message, etc. The response message may include information such as an SSID or an IP address useful for contacting the target computing device. The VOIP application server may then continue with the operations in optional block 303.

Figure 4:
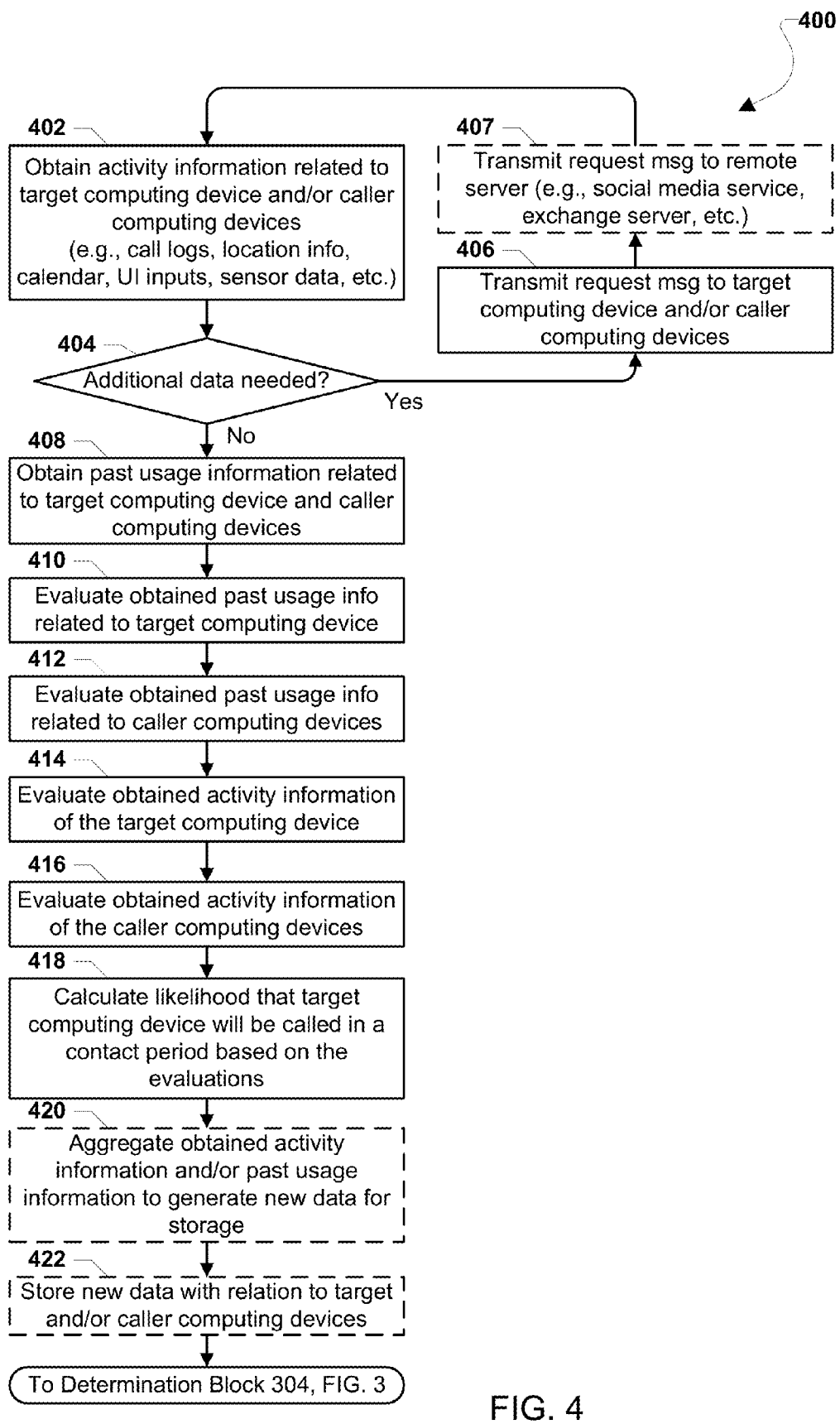
FIG. 4 is a process flow diagram illustrating an embodiment method for a VOIP application server to calculate a likelihood that a target computing device will be called via Internet protocol communications software.

FIG. 4 illustrates an embodiment method 400 for a VOIP application server to calculate a likelihood that a target computing device will be called via Internet protocol communications software, such as a VOIP application. In an embodiment, the operations of the method 400 may be performed by the VOIP application server in place of the operations of block 302 described above with reference to FIG. 3. For example, the VOIP application server may be configured to perform the operations of the method 400 while executing the method 300. In various embodiments, the VOIP application server may perform the method 400 periodically, such as every few seconds, minutes, hours, etc. In an embodiment, the method 400 may be performed in response to messaging received from the target computing device. For example, the VOIP application server may perform the method 400 when in receipt of a message transmitted by the target computing device in response to a user input (e.g., a user taps a soft button on the target computing device labeled "Check the likelihood of being called.").

In block 402, the VOIP application server may obtain activity information related to the target computing device and/or caller computing devices. Caller computing devices may be the devices listed in the target computing device's contacts database, such as an address book data structure associated with the VOIP application and stored on the target computing device. In another embodiment, the caller computing devices may be any or all of the devices registered to use the VOIP application. In other words, the VOIP application server may monitor messages from all registered devices in order to identify activity information relevant to a target computing device, regardless of the information in address books.

The VOIP application server may obtain the activity information by receiving the information via VOIP application messaging (e.g., proprietary messaging that includes activity information), receiving the information via piggy-back or opportunistic data transmissions within non-proprietary messaging from computing devices (e.g., metadata indicating activity information received within out-of-band transmissions, etc.), and/or from communications with third-party sources (e.g., a social network VOIP application server, etc.). For example, using account credentials stored at the VOIP application server, the VOIP application server may access online accounts (e.g., social networking accounts) maintained by a third-party server and that are associated with the target computing device in order to retrieve calendar data (e.g., scheduled meetings, plans to go to lunch, etc.) and/or online account status information (e.g., "busy" status indicator) about the user of the target computing device. As another example, the VOIP application server may obtain the activity information as metadata within periodic check-in messages associated with the VOIP application and transmitted by the target computing device and/or caller computing devices. In various embodiments, the VOIP application server may store received activity information from the various devices, such as in a buffer, database records, or profiles associated with the respective parties. For example, the VOIP application server may obtain activity information related to the target computing device by retrieving activity information stored in a profile linked to the user of the target computing device.

In determination block 404, the VOIP application server may determine whether additional data is needed. For example, the VOIP application server may determine that it has not previously received activity information, such as accelerometer sensor data, calendar information, and/or GPS coordinates, and thus may not have enough information to calculate a likelihood value. The VOIP application server may determine additional data is needed when available or already obtained activity information is stale or out-of-date, or alternatively, when obtained activity information includes erroneous or contradictory data. For example, when the obtained activity information indicates the target computing device is being used based on accelerometer sensor data that shows motion, but calendar information indicates the target computing device is not available at a certain time, the VOIP application server may determine that updated activity information may be needed from the target computing device.

If the VOIP application server determines additional data is needed (i.e., determination block 404="Yes"), in block 406 the VOIP application server may transmit a request message to the target computing device and/or the caller computing devices. For example, when activity information related to the target computing device is missing or stale, the VOIP application server may transmit a request message to the target computing device to provide up-to-date sensor data. As another example, when a calendar entry for a meeting between the target computing device and a caller computing device is older than a freshness threshold, the VOIP application server may transmit a request message to the caller computing device to confirm the meeting time. In optional block 407, the VOIP application server may transmit a request message to a remote server, such as a social media/networking service or an exchange server. For example, using transmissions over the Internet, the VOIP application server may transmit a request for activity information, such as a social network status indicator of a user of the target computing device, from a remote server that maintains the social network service. The VOIP application server may then continue with the activity information obtaining operations in block 402.

If the VOIP application server determines additional data is not needed (i.e., determination block 404="No"), in block 408 the VOIP application server may obtain past usage information related to the target computing device and the caller computing devices. The past usage information may be stored within a database, such as within profiles linked to accounts for the VOIP application (e.g., an account of the user of the target computing device, accounts for users of caller computing devices, etc.). The past usage information may include aggregated, summarized, and historical data describing the use of the VOIP application by the target computing device and/or the caller computing devices. For example, the past usage information may include information that describes patterns or trends in the time of day, duration, and location at which the target computing device has received IP communications over a previous time period. The past usage information may indicate various circumstantial relationships, such as relationships between location, time of day, day of week, and calling history using the VOIP application. For example, the past usage information may indicate the GPS coordinates at which a certain caller computing device has typically initiated an IP communication using the VOIP application, the time of day that the target computing device typically receives the most number of IP communications, the average number of IP communications (or IP calls) the target computing device receives during the evening, etc. .

The past usage information may relate the target computing device to the caller computing devices or alternatively may include information that describes the activities of the devices individually. For example, the past usage information may include data indicating the times of day over the last year when a certain caller computing device exchanged IP communications with the target computing device using the VOIP application. As another example, the past usage information may include data indicating the times of day over the last year the target computing device engaged in an IP communication with any other device.

In block 410, the VOIP application server may evaluate the obtained past usage information related to the target computing device, such as historical data of the target computing device's use of the VOIP application. The VOIP application server may identify conditions, patterns, trends, or other factors within the past usage information that indicate whether the target computing device may receive an IP communication with the VOIP application in an upcoming contact period. The VOIP application server may be configured to process call logs (or other stored historical data) to detect relationships between the target computing device's previous IP communication activity and at least one of a time of day, a day of week, a location, and applications software executing on the target computing device at the time of the IP communication activities. For example, the VOIP application server may identify whether there is a trend of the target computing device receiving IP communications when the target computing device is connected to a certain local area network (e.g., a workplace LAN). As another example, the VOIP application server may identify times of the various workdays in which the target computing device typically receives more IP communications with the VOIP application (e.g., in the afternoon, prior to a regular touch-base meeting, etc.).

In block 412, the VOIP application server may evaluate the obtained past usage information related to the caller computing devices. The operations in block 412 may be similar to the operations in block 410, except the VOIP application server may evaluate the past usage information of other devices that may initiate IP communications with the target computing device to identify conditions, patterns, trends, or factors that indicate a likelihood of those devices initiating IP communications with the target computing device. For example, the VOIP application server may evaluate the historical calling behaviors of all the mobile devices registered to use the VOIP application that are indicated in the address book of the target computing device. The VOIP application server may only evaluate the past usage information for each caller computing device that involves IP communications with the target computing device. For example, the VOIP application server may identify the most frequent time of day, day of week, Internet connection (e.g., LAN, LTE network, etc.), and/or location corresponding to a certain caller computing device initiating IP communications with the target computing device using the VOIP application. The past usage information may not only include data regarding successful IP communications, but may also include data related to attempted IP communications to the target computing device. For example, the VOIP application server may identify conditions (e.g., time of day, etc.) corresponding to attempted IP communications from a certain caller computing device where there was no answer at the target computing device and/or the target computing device was not online (i.e., the VOIP application was not executing on the target computing device).

In block 414, the VOIP application server may evaluate the obtained activity information of the target computing device. For example, the VOIP application server may evaluate calendar data to identify whether there are any scheduled IP communications scheduled for an upcoming contact period (e.g., the next few minutes, hours, day, etc.). The VOIP application server may also compare the obtained activity information to the past usage information related to the target computing device to detect any relevant occurrences. For example, the VOIP application server may compare the current location data (e.g., GPS coordinates) and/or current network connection information (e.g., SSID, connected LAN, etc.) to historical trends of receiving IP communications from various caller computing devices. In an embodiment, the VOIP application server may also evaluate online account status information (e.g., social networking activity information), such as status indicators from social network profiles, to identify conditions or changes in status of the target computing device. For example, the VOIP application server may identify that a social networking website profile associated with the target computing device includes a status indicator advertising that the target computing device (or its user) is available for chatting.

In block 416, the VOIP application server may evaluate the obtained activity information of the caller computing devices. The operations performed in block 416 may be similar to those performed in block 414, except that the VOIP application server may evaluate the activity information of the caller computing devices for current actions, scheduled calendar items, conditions, and/or indicators relevant to the initiation of IP communications with the target computing device via the VOIP application. For example, the VOIP application server may compare current GPS coordinates of a certain computing device to locations that the certain computing device has historically called the target computing device via the VOIP application.

In an embodiment, the VOIP application server may evaluate activity information that indicates user interface (UI) inputs on the caller computing devices. In particular, the VOIP application server may receive activity information from the caller computing devices that describes how the caller computing devices (and their users) are executing and otherwise using the VOIP application. For example, the VOIP application server may evaluate activity information that indicates a certain caller computing device has loaded the VOIP application or has accessed a certain screen/menu within the VOIP application. As another example, the VOIP application server may evaluate activity information to identify whether the certain caller computing device has detected user inputs associated with the target computing device. In an embodiment, the user interface inputs on a caller computing device may include a touch input that coincides with a picture of the user of the target computing device, such as a tap/click/touch on a picture within an address book within the VOIP application. In another embodiment, the activity information may include information indicating the caller computing device received input data that corresponds to the contact number/address of the target computing device, etc. In an embodiment, the activity information associated with a caller computing device may indicate the user of the caller computing device has spoken the name of the user of the target computing device, such as a voice command for making an IP call to the target computing device.

In block 418, the VOIP application server may calculate the likelihood that the target computing device will be called in a contact period based on the evaluations, such as the various evaluations described with reference to blocks 410-416. The VOIP application server may utilize any identified associations, relationships, patterns, trends, and conditions based on past usage information and various activity information evaluations to determine whether the target computing device will likely be called. In an embodiment, the VOIP application server may utilize various weighting schemes, formulas, and/or equations to place more or less emphasis on the resulting information from the evaluations of the operations in blocks 410-416. For example, the VOIP application server may calculate a greater likelihood of a call based on historical trending data related to the target computing device alone than based on activity information indicating a certain caller computing device has accessed an address book entry for the target computing device within the VOIP application. In an embodiment, the calculated likelihood value may be a combinatory value based on a plurality of individual calculations, such as individual likelihoods based on heuristics or activity information of caller computing devices. In various embodiments, the calculated likelihood may be a binary or Boolean value (e.g., 'yes' or 'no'), a numeric value (e.g., the number out of 100 that the target computing device may be called in the contact period, etc.), or a percentage value.

In optional block 420, the VOIP application server may aggregate the obtained activity information and/or the past usage information to generate new data for storage. For example, the VOIP application server may combine, average, min/max, and merge current activity information for caller computing devices and/or the target computing device with previously obtained activity information for the caller computing devices and/or the target computing device. As another example, the VOIP application server may update the past usage information with the obtained activity information and/or the calculated likelihood value. In optional block 422, the VOIP application server may store the new data generated in relation to the target computing device and/or the caller computing devices. For example, the VOIP application server may update a stored profile related to the target computing device with new past usage information. As another example, the VOIP application server may add a status indication update to the stored profile of a caller computing device related to the VOIP application. The VOIP application server may then continue with the operations in determination block 304 in FIG. 3.

Figure 5:
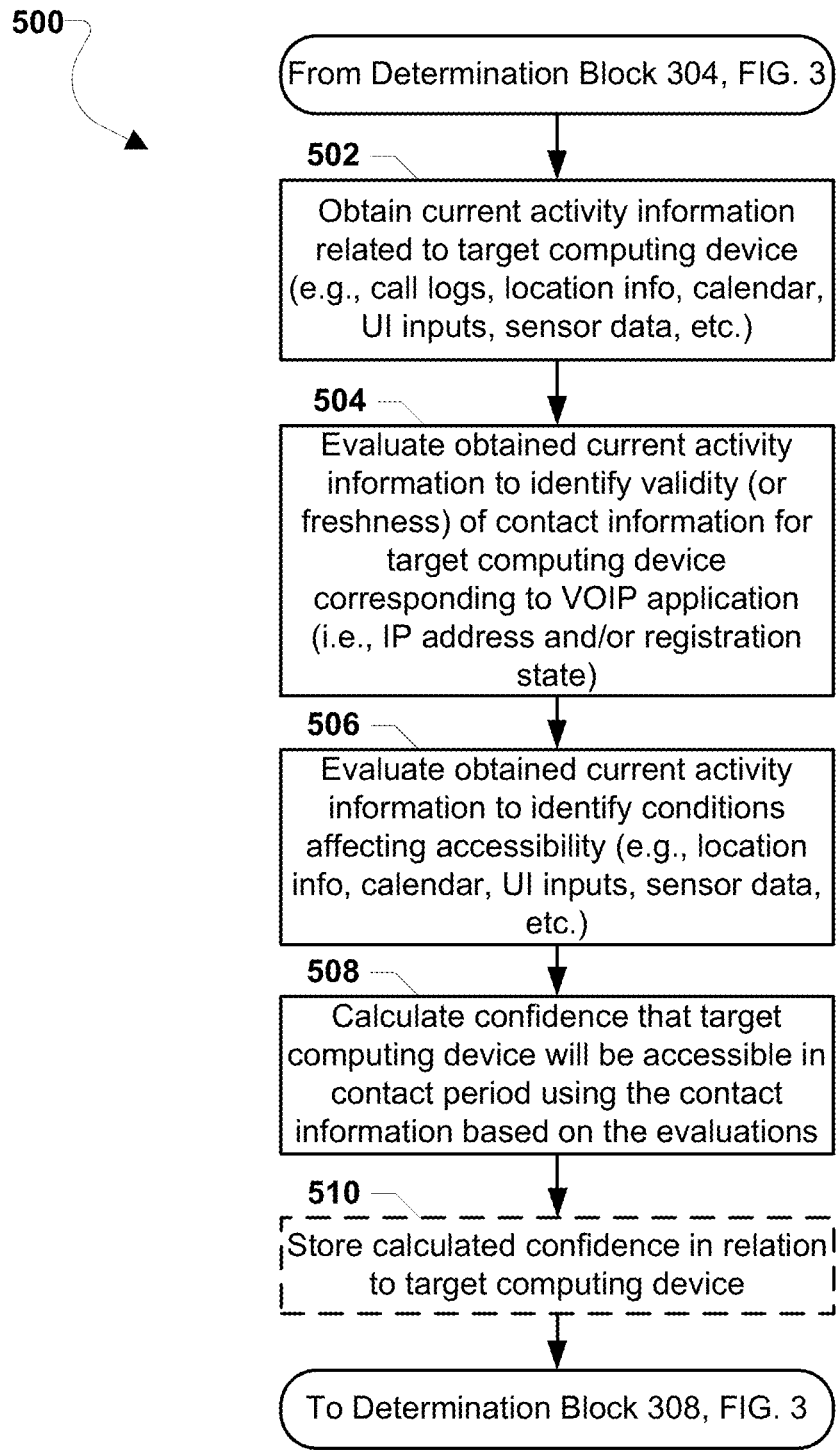
FIG. 5 is a process flow diagram illustrating an embodiment method for a VOIP application server to calculate a confidence that a target computing device will be accessible via Internet protocol communications software.

FIG. 5 illustrates an embodiment method 500 for a VOIP application server to calculate a confidence that a target computing device will be accessible via Internet protocol communications software, such as a VOIP application. In an embodiment, the operations of the method 500 may be performed by the VOIP application server in place of the operations of block 306 described above with reference to FIG. 3. For example, the VOIP application server may be configured to perform the operations of the method 500 while executing the method 300.

In block 502, the VOIP application server may obtain current activity information related to the target computing device. The current activity information may include various data that indicates the current activities, presence, location, and status of the target computing device. For example, the current activity information may include recent call log information (e.g., the time of the last IP communication with the VOIP application, the duration of the last IP communication with the VOIP application, etc.), location information for the target computing device (e.g., GPS coordinates, SSID of connected network, etc.), calendar data (e.g., any scheduled activities for the hour, day, week, etc.), online account status information (e.g., Facebook status, etc.), data describing recent user inputs received on the target computing device (e.g., taps on a touch screen, etc.), and sensor data (e.g., accelerometer sensor data, etc.). In an embodiment, the current activity information may be data describing the target computing device activities throughout a recent timeframe (e.g., the last minute, hour, day, etc.).

The VOIP application server may obtain the current activity information in various ways, such as receiving the activity information within VOIP application messaging from the target computing device over the Internet. For example, the VOIP application server may parse received messages from the target computing device to detect metadata and/or other information that includes the activity information. In another embodiment, the activity information may be retrieved by the VOIP application server from a storage device, such as a database coupled to the VOIP application server, or alternatively may be received by the VOIP application server via Internet protocols from a third-party server, such as a social networking or cloud services computer. In an embodiment, the operations in block 502 may be similar to the operations described above with reference to block 402 in FIG. 4.

In block 504, the VOIP application server may evaluate the obtained current activity information to identify the validity (or freshness) of contact information for the target computing device corresponding to the VOIP application. For example, the VOIP application server may determine whether a VOIP application registration and/or IP address associated with the target computing device is fresh based on evaluating whether the target computing device just ended a first IP communication using the VOIP application, whether the target computing device has been involved in a second IP communication with the VOIP application within a timeframe (e.g., the last minute, hours, etc.), and the device type of the target computing device. Contact information may include any data needed for the VOIP application server to communicate with the target computing device via the VOIP application or similar IP communications. In particular, the contact information may include registration information (e.g., a registration state, an IP address, etc.) indicating that the target computing device has activated the VOIP application for use in receiving and/or transmitting IP communications with the VOIP application server and/or other devices (e.g., caller computing devices). In an embodiment, the VOIP application server may store the contact information in a profile (or database record) associated with the target computing device, and further may update the stored contact information over time. For example, the VOIP application server may update a data field within the target computing device's stored profile indicating the latest IP address reported by the target computing device. Current activity information evaluated by the VOIP application server in block 504 may include data, such as information indicating the time since the last IP communication the target computing device participated in, movement information (e.g., GPS coordinates over a period, etc.), and the connected network (e.g., LAN, LTE cellular network, etc.). In an embodiment, the contact information may also indicate a "check-in" date, such as the last time the VOIP application server confirmed the validity of the IP address and/or registration information of the target computing device.

The VOIP application server may utilize various functions, rules, or logic to evaluate the obtained current activity information and generate conclusions about how reliable the contact information is. For example, the VOIP application server may identify the time elapsed since the target computing device initiated an IP communication with the chat application, and may assess the contact information to be less reliable the longer the elapsed time. As another example, the VOIP application server may evaluate GPS coordinates to identify whether the target computing device has been moving, and may assess the contact information to be less reliable when movement is fast and/or over large physical distances (e.g., the target computing device may be moving in a vehicle, etc.).

In an embodiment, the VOIP application server may evaluate information indicating what type of device the target computing device is, as different types may be more likely to have invalid (or stale) IP addresses and/or registration data. As mobile computing devices (e.g., smartphones) may move more often than stationary devices (e.g., desktops), when the target computing device is a mobile device, it may move from network to network and change IP addresses regularly. Thus, the type of device may be evaluated to identify a probability that the contact information is still valid. For example, when the target computing device is a desktop computer, the VOIP application server may determine a high probability that the contact information is still valid, as desktop computers may rarely be moved once installed within a network. As another example, when the target computing device is a tablet mobile computing device, the VOIP application server may determine a moderate probability that the contact information is still valid, as tablet mobile devices may often be used within a single place (e.g., a home, a business, etc.). As yet another example, when the target computing device is a smartphone mobile computing device, the VOIP application server may determine a low probability that the contact information is still valid, as smartphone mobile computing devices may often be carried into various locations and thus may often connect with different network access points.

In block 506, the VOIP application server may evaluate the obtained current activity information to identify conditions that may affect accessibility of the target computing device. For example, as a carried device may be more accessible than a device that is laid on a table, the VOIP application server may evaluate accelerometer sensor data to identify whether the target computing device is experiencing movement (e.g., the device is being carrying by a user). As another example, the VOIP application server may evaluate data indicating user inputs detected on the target computing device (e.g., touches on a touch screen related to the VOIP application) to identify whether the target computing device is being used and thus may (or may not) be accessible.

In an embodiment, the VOIP application server may interpret calendar or other schedule information to identify whether the target computing device may be accessible. For example, the VOIP application server may process calendar information to identify whether the target computing device is scheduled to participate in a phone conference and/or whether the user of the target computing device is to participate in a meeting in the near future, making the target computing device (and its user) less accessible. The VOIP application server may interpret calendar information, such as calendar entry data, transmitted to the VOIP application server via VOIP application messaging (or out-of-band messaging) to identify times the target computing device may be accessible/inaccessible. As described above, the VOIP application server may further interpret notes and/or information within calendar information to further interpret potential availability of the target computing device. For example, when a calendar entry indicates a scheduled event is important or involves a person of importance (e.g., "Meeting with boss," "home loan meeting with bank," etc.), the VOIP application server may assess the target computing device to have a higher probability of actually adhering to that schedule, and thus may be inaccessible (or unavailable) for another IP communication at that time.

In another embodiment, the VOIP application server may evaluate the location information of the target computing device to identify whether the target computing device (or its user) is accessible for certain types of caller computing devices. For example, when the current activity information indicates that the target computing device is at a work location, the VOIP application server may determine low accessibility for the target computing device receiving IP communications from caller computing devices of social acquaintances, as the user of the target computing device may not desire to be disturbed when working. As another example, the VOIP application server may additionally evaluate the location information with reference to the time of day and/or day of the week, such that the target computing device may be considered more accessible for receiving IP communications from friends on the weekend days and more accessible for receiving IP communications from family members during weeknights. In various embodiments, the VOIP application server may evaluate the activity information using parameters, rules, and/or logic stored within profiles associated with the target computing device (e.g., user preferences, user-defined accessibility rules, etc.).

In another embodiment, the VOIP application server may also evaluate online account status information, such as account status data or indicators on social media or social networking websites. For example, the VOIP application server may identify a user's accessibility for an incoming IP call based on notes left on an online message board (e.g., "Going to church in 5 minutes," etc.) or preset status flags (e.g., "busy," "offline," etc.).

In block 508, the VOIP application server may calculate a confidence value regarding whether the target computing device will be accessible in a contact period using the contact information based on the evaluations, such as the evaluations described above with reference to the operations in blocks 504-506. The VOIP application server may utilize any identified associations, patterns, relationships, trends, and conditions based on the various evaluations to determine whether the target computing device will be accessible in the contact period. In an embodiment, the VOIP application server may utilize various weighting schemes, formulas, and/or equations to place more or less emphasis on the resulting information from the evaluations from the operations in blocks 504-506. In various embodiments, the calculated confidence may be a binary or Boolean value (e.g., 'yes' or 'no'), a numeric value (e.g., the number out of 100 that the target computing device may be accessible in the contact period, etc.), or a percentage value. As described above, the contact period may be a predefined time period, such as a number of seconds, minutes, hours, etc. in the future.

In an embodiment, the VOIP application server may also evaluate past usage information and other historical or archived data when calculating the confidence. For example, the VOIP application server may analyze stored data that indicates past occurrences of the target computing device registering (or re-registering) the VOIP application in order to assess the probability that the VOIP application is active at a given time.

In optional block 510, the VOIP application server may store the calculated confidence (or confidence value) in relation to the target computing device, such as within a field of a database record or profile associated with the target computing device. Such store confidence values may be used in future evaluations and may be cross-referenced with various types of information in order to generate past usage information. The VOIP application server may then continue with the operations in determination block 308 in FIG. 3.

Figure 6A:
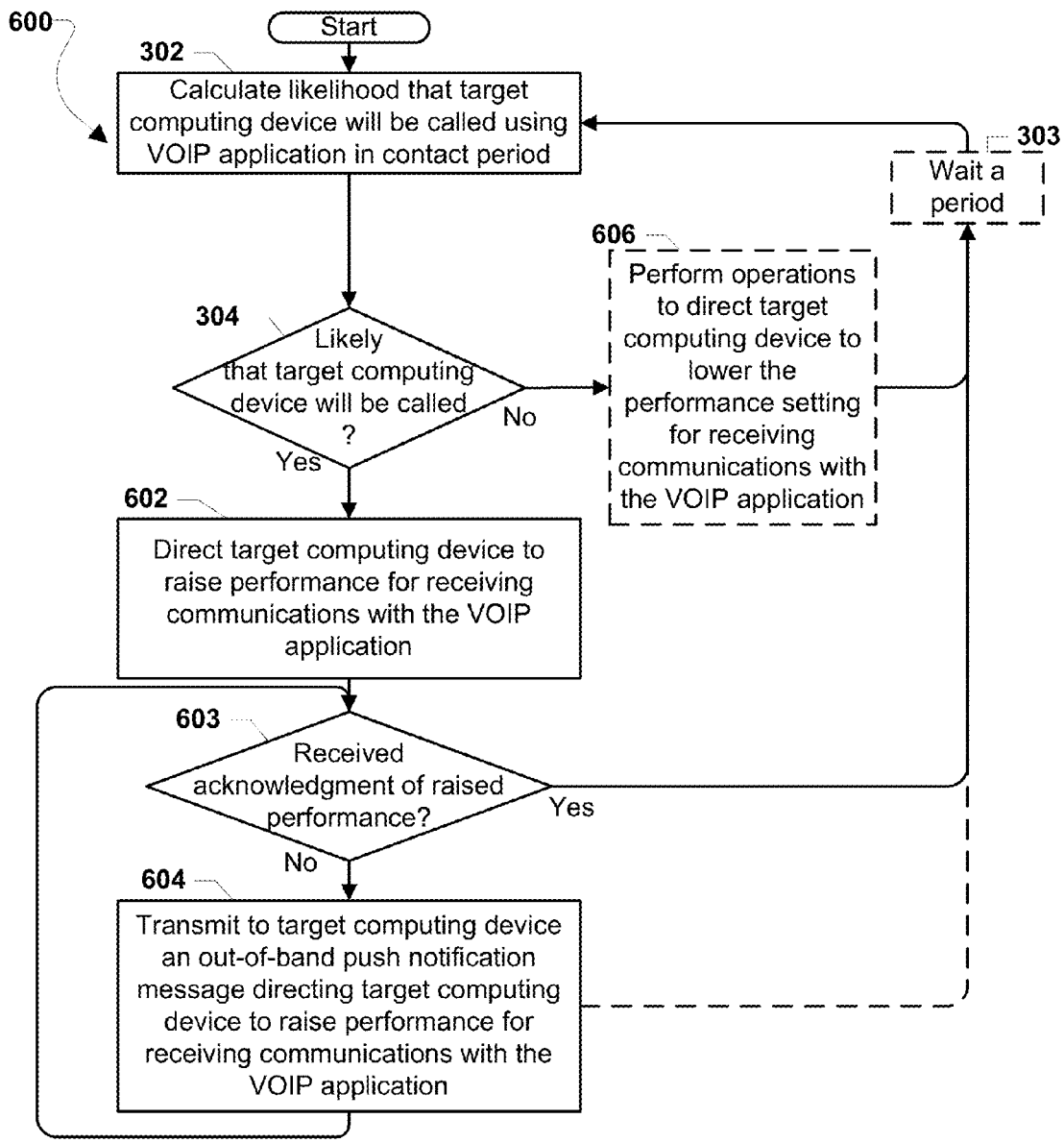
FIGS. 6A-6B are process flow diagrams illustrating embodiment methods for a VOIP application server to perform operations to improve the performance of a target computing device that is likely to be contacted via Internet protocol communications software.
Figure 6B:
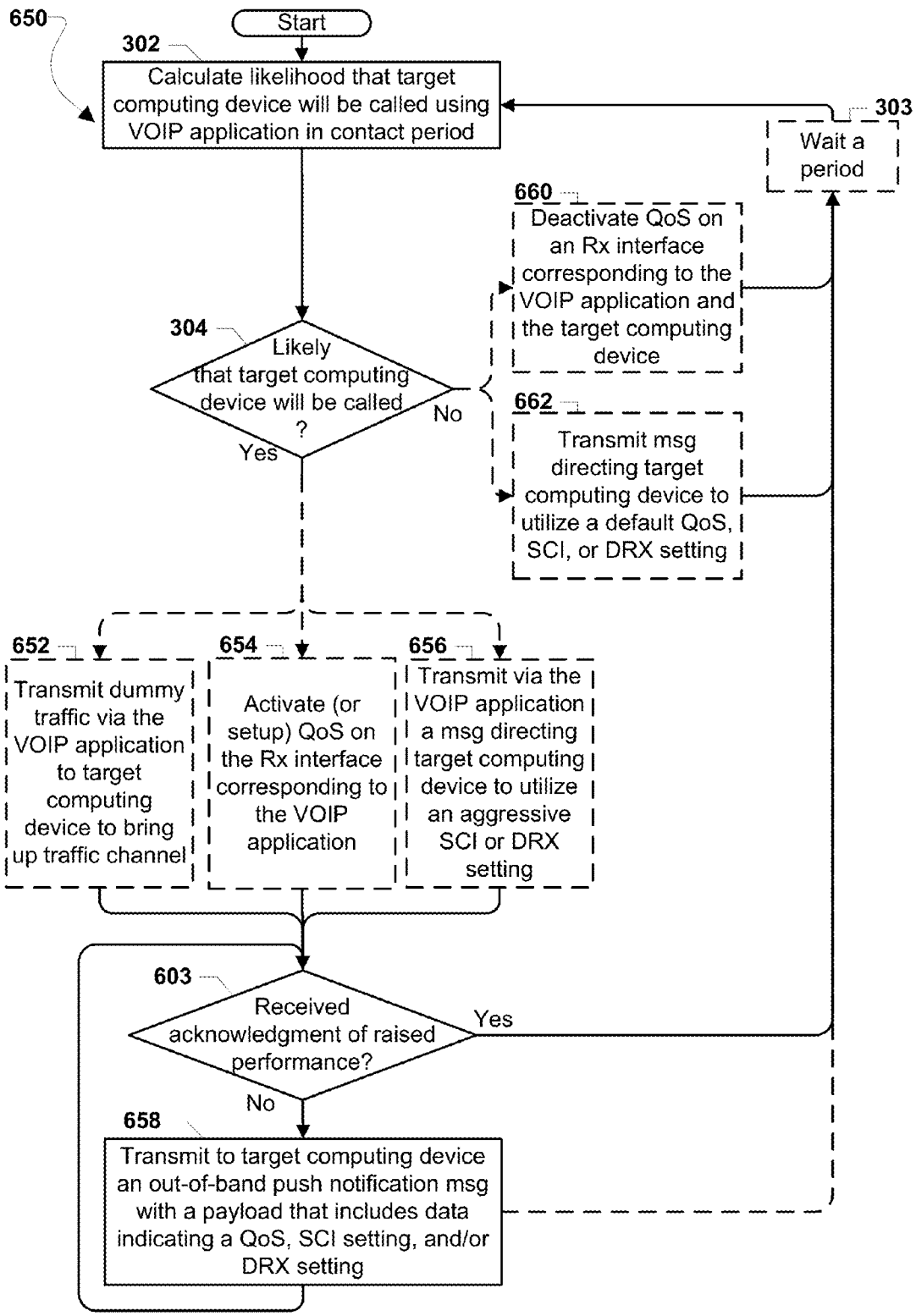

FIGS. 6A-6B illustrate embodiment methods 600, 650 for a VOIP application server to perform operations to improve the performance of a target computing device that is likely to be contacted via Internet protocol communications software (i.e., a VOIP application). The methods 600, 650 may include operations similar to those described above with reference to FIG. 300. For example, the methods 600, 650 may include operations for the VOIP application server to determine the likelihood that a particular target computing device (e.g., a smartphone) may be contacted via the VOIP application. However, the methods 600, 650 may be different in that they may be performed by the VOIP application server to proactively cause the particular target computing device to be configured for improved performance for handling a likely incoming call. For example, the VOIP application server may send dummy traffic to the target computing device prior to a likely incoming call from another party in order to cause the target computing device to have an active, high quality of service (QoS) traffic channel for the incoming IP communication (or call).

In some embodiments, the VOIP application server may be configured to perform the operations of the embodiment methods 600, 650 for each in a plurality of target computing devices that may participate in a likely group call. For example, the VOIP application server may transmit out-of-band push notifications to a plurality of smartphones configured to receive calls via the VOIP application in response to determining a group call is likely to be initiated for the plurality of smartphones, wherein the out-of-band push notifications may indicate high performance settings should be set at the plurality of smartphones.

FIG. 6A illustrates an embodiment method 600 that includes general operations for improving the performance of a target computing device prior to receiving a likely incoming IP communication (or IP call). The operations in blocks 302-304 are similar to as described above with reference to FIG. 3. In response to determining that the target computing device is not likely to be called (i.e., determination block 304="No"), the VOIP application server may perform operations to direct the target computing device to lower the performance setting for receiving the IP communication with the VOIP application in response to determining that the target computing device is not likely to be called using the VOIP application in optional block 606, such as by directing the use of settings that improve power conservation (e.g., default SCI settings or DRX settings, setting no QoS reservations, a combination of settings, etc.). Lowering the performance setting may include causing the target computing device to return to a default performance (or default performance setting) or a conservative performance setting for receiving communications (e.g., IP calls) with the VOIP application. For example, the VOIP application server may transmit messages associated with the VOIP application that may cause the target computing device to activate a configuration or setting that utilizes a normal amount of power consumption to monitor for incoming IP calls. Further, lowering the performance setting may include adjusting one or more settings or a combination of settings, such as DRX settings and/or SCI settings. Such combinations may be predefined on the target computing device and/or the VOIP application server.

The operations of optional block 606 may be optional as the VOIP application server may not be required to perform such operations when it has not previously performed the operations in block 604 described below. For example, if the VOIP application server has not previously predicted that the target computing device will be called, there may be no need to cause the target computing device to return to a default performance configuration. The VOIP application server may then perform the wait operations in optional block 303 and continue with the calculation operations in block 302.

In response to determining that the target computing device is likely to be called (i.e., determination block 304="Yes"), the VOIP application server may perform operations to direct the target computing device to raise its performance (or performance setting) for receiving communications with the VOIP application in block 602. In other words, the VOIP application server may cause the target computing device to be configured with settings or configurations that enable the target computing device to better receive and otherwise handle incoming IP communications associated with the VOIP application (e.g., VOIP calls, etc.). For example, the VOIP application server may setup a QoS on the Rx interface utilized by the target computing device in order to ensure the target computing device establishes a particular level of communication fidelity for a potential IP call. FIG. 6B described below includes various specific operations that may be performed by the VOIP application server to direct the target computing device to raise its performance. Such improved performance settings may cause increased resource usage (e.g., power conservation). Further, raising the performance setting may include causing the target computing device to set a high-performance setting as opposed to a default performance setting or a conservative performance setting for receiving communications. For example, the VOIP application server may transmit messages associated with the VOIP application that may cause the target computing device to activate a configuration or setting that utilizes a high amount of power to monitor for incoming IP calls. Further, raising the performance setting may include adjusting one or more settings or a combination of settings, such as DRX settings and/or SCI settings. Such combinations may be predefined on the target computing device and/or the VOIP application server.

In determination block 603, the VOIP application server may determine whether an acknowledgement is received that indicates the target computing device has raised the performance for receiving communications with the VOIP application in response to the VOIP application server performing the operations of block 602. Such an acknowledgement may be a response message from the target computing device transmitted via the VOIP application (e.g., in-band messaging) in response to the VOIP application server performing the operations in block 602. For example, the VOIP application server may receive a response message that indicates that the target computing device has received a message from the VOIP application server and has in response activated a configuration that utilizes an aggressive slot cycle index setting. In some embodiments, the acknowledgement may not be a message from the target computing device, but instead may be a condition identified by the VOIP application server that indicates that the target computing device has raised its performance for receiving communications. For example, the VOIP application server may identify an increased frequency with which the target computing device pings or checks in with the VOIP application server via VOIP application signaling. In some embodiments, the operations in determination block 603 may be similar to the operations in determination block 312 described above with reference to FIG. 3.

In response to determining that the VOIP application server received an acknowledgement (i.e., determination block 603="Yes"), the VOIP application server may continue with the optional wait operations in optional block 303 and the calculation operations in block 302.

In response to determining that the VOIP application server has not received an acknowledgement (i.e., determination block 603="No"), the VOIP application server may transmit an out-of-band push notification message to the target computing device directing the target computing device to raise the performance for receiving communications with the VOIP application in block 604. As described above, such an out-of-band push notification message may not be transmitted via the VOIP application, but instead may be transmitted to the target computing device via another communication pathway or available messaging protocol separate from the VOIP application. The target computing device may not need to be actively executing the VOIP application in order to receive and respond to the push notification message from the VOIP application server.

After transmitting the out-of-band push notification message in block 604, the VOIP application server may continue determining whether an acknowledgment is received in determination block 603. For example, the VOIP application server may monitor for messages confirming that a configuration or setting has been adjusted at the target computing device based on the out-of-band push message. As another example, the VOIP application server may be configured to detect the target computing device has received the out-of-band push message based on subsequent communications with the VOIP application server via the VOIP application or alternatively out-of-band response messages received from the target computing device. In some embodiments, the VOIP application server may continue with the wait operations in optional block 303 and the calculation operations in block 302 in response to performing the operations in block 604.

FIG. 6B illustrates an embodiment method 650 that includes specific operations for improving the performance of a target computing device prior to receiving a likely incoming IP communication (or IP call). The method 650 is similar to the method 600 described above with reference to FIG. 6A, except that the method 650 includes specific operations for the VOIP application server to direct the target computing device to configure itself for improved performance for receiving IP communications. For example, the VOIP application server may transmit messages to the target computing device that may affect (e.g., raise or lower) a slot cycle index setting of the target computing device.

The operations in blocks 302-304 are similar to as described above with reference to FIG. 3. In response to determining that the target computing device is likely to be called (i.e., determination block 304="Yes"), the VOIP application server may be configured to perform any or all of the operations in optional block 652, optional block 654, and optional block 656 as described below.

In optional block 652, the VOIP application server may transmit dummy traffic via the VOIP application to the target computing device to bring up a traffic channel used by the target computing device. Such dummy traffic may not include any useable data. For example, the VOIP application server may transmit one packet, a batch of packets, or a continuous stream of packets to the target computing device via VOIP application communication channel in order to cause the target computing device to begin actively processing packets associated with the VOIP application. Such dummy traffic may prepare the target computing device to process subsequent packets that may be associated with an actual incoming IP communication from another party.

In optional block 654, the VOIP application server may activate (or setup) a quality-of-service (QoS) on an Rx interface corresponding to the VOIP application and the target computing device. For example, the VOIP application server may establish a particular quality-of-service standard that is communicated via the Rx interface associated with the target computing device.

In optional block 656, the VOIP application server may transmit via the VOIP application a message directing the target computing device to utilize an aggressive slot cycle index (SCI) setting or an aggressive discontinuous reception (DRX) setting. In general, the SCI setting may indicate the timing or interval with which the target computing device may wake-up to monitor for messages, such as notifications or messages on a paging channel used in a Code Division Multiple Access (CDMA) communication system. A lower SCI setting (e.g., a lower value) may cause the target computing device to wake more often to monitor for messages; however, a lower SCI setting may also cause greater power consumption due to the increased activity. For example, when associated with a 1x CDMA network or Evolution-Data Only (EVDO) network, the VOIP application server may transmit a message that includes a code, command, or other data that may cause the target computing device to configure itself with a lower SCI value so that the target computing device may more frequently check for messages. As another example, when associated with a Long Term Evolution (LTE) network, the VOIP application server may transmit a message that includes a code, command, or other data that may cause the target computing device to configure itself with a more aggressive DRX setting for more frequent periods of data transfers with its engaged receiver.

In some embodiments, the VOIP application server may be configured to set various settings to improve the performance of the target computing device. For example, the VOIP application server may also perform operations to cause the target computing device to adjust QoS reservation and particular UMTS and LTE traffic profiles/classes (i.e., QoS class indicators (QCI)) to improve performance.

In response to performing any or all of the operations in optional blocks 652-656, the VOIP application server may determine whether an acknowledgement is received in determination block 603 for as described above. In response to determining that an acknowledgement is received (i.e., determination block 603="Yes"), the VOIP application server may continue with the wait operations in optional block 303 and the calculation operations in block 302 as described above.

In response to determining that the acknowledgement is not received (i.e., determination block 603="No"), the VOIP application server may transmit to the target computing device an out-of-band push notification message with a payload that includes data indicating a QoS, a SCI setting, and/or a DRX setting in block 658. Such an out-of-band push notification may include settings information or other configuration data similar to the information transmitted via the VOIP application in optional blocks 652, 656. The VOIP application server may then continue with the operations for determining whether an acknowledgement is received in determination block 603. Alternatively, the VOIP application server may continue with the wait operations in optional block 303.

In response to determining that the target computing device is not likely to be called (i.e., determination block 304="No"), the VOIP application server may be configured to deactivate a QoS on the Rx interface corresponding to the VOIP application and the target computing device in optional block 660. Instead of or in addition to performing the operations of optional block 660, the VOIP application server may transmit a message directing the target computing device to utilize a default quality-of-service (QoS), a default slot cycle index (SCI) setting, and/or a default discontinuous reception (DRX) setting in optional block 662. The default settings may be "conservative" settings that may enable the target computing device to utilize less resources. The operations in blocks 660, 662 may be performed when the VOIP application server has already performed operations to direct the target computing device to raise its performance for receiving calls, such as by performing the operations in optional blocks 652-656 described above. In other words, the VOIP application server may only deactivate the QoS on the Rx interface and/or transmit the message directing the use of a default SCI, DRX, or QoS setting when it has previously performed operations to activate the QoS on the Rx interface and/or transmit the message directing the use of raised settings. The VOIP application server may then continue with the wait operations in optional block 303 and the calculation operations in block 302.

In some embodiments, the VOIP application server may be configured to set various settings to reduce the performance of the target computing device in order to conserve resources when a call is not likely. For example, the VOIP application server may also perform operations to cause the target computing device to adjust QoS reservation and particular UMTS and LTE traffic profiles/classes (i.e., QoS class indicators (QCI)) to decrease resource consumption.

Figure 7:
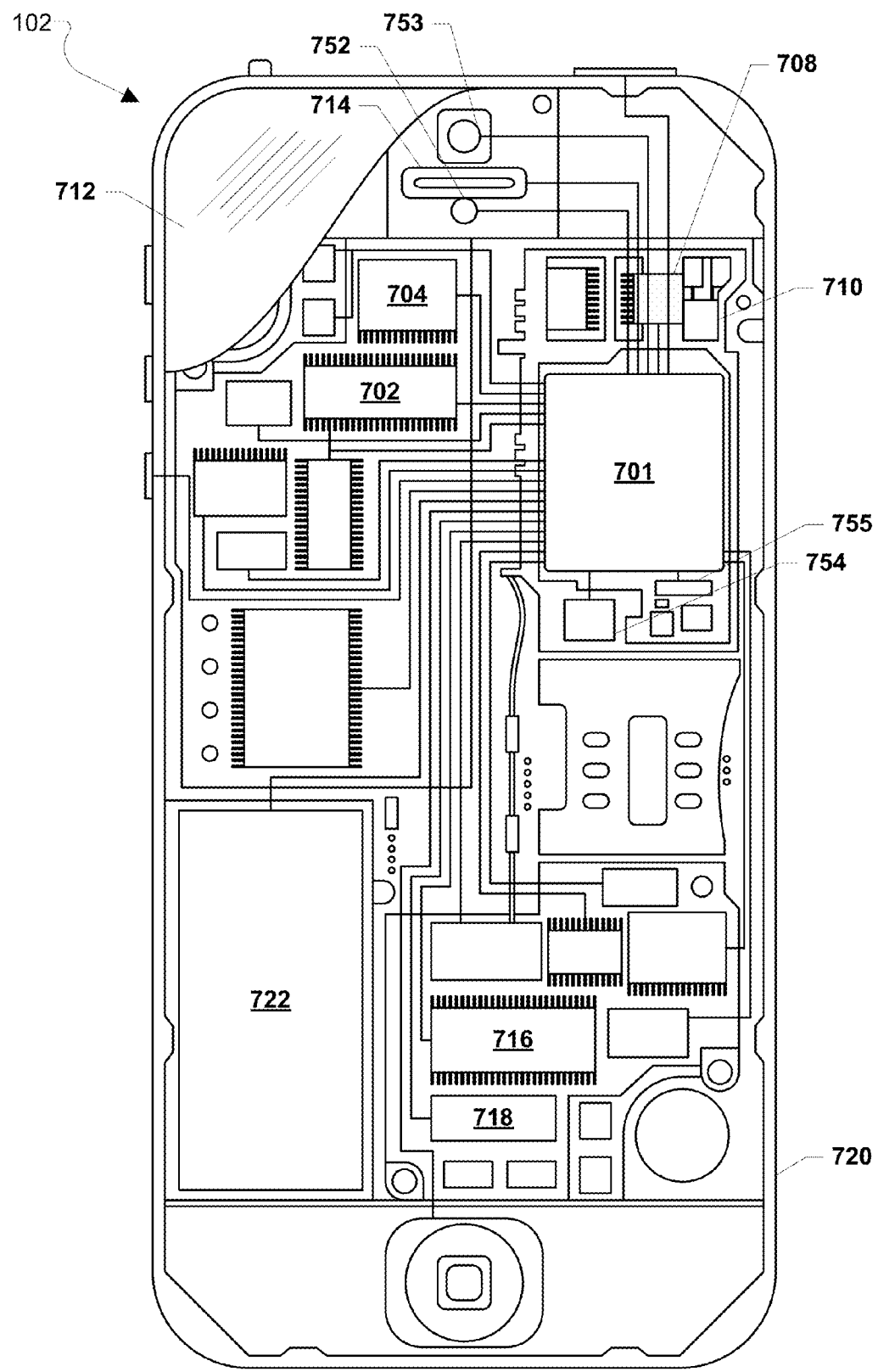
FIG. 7 is a component block diagram of a smartphone computing device suitable for use with the various embodiments.

FIG. 7 illustrates an example smartphone computing device 102 suitable for use with the various embodiments. A smartphone computing device 102 may include a processor 701 coupled to a touch screen controller 704 and an internal memory 702. The processor 701 may be one or more multi-core ICs designated for general or specific processing tasks. The internal memory 702 may be volatile or non-volatile memory, and may also be secure and/or encrypted memory, or unsecure and/or unencrypted memory, or any combination thereof. The touch screen controller 704 and the processor 701 may also be coupled to a touch screen panel 712, such as a resistive-sensing touch screen, capacitive-sensing touch screen, infrared sensing touch screen, etc. The smartphone computing device 102 may have one or more radio signal transceivers 708 (e.g., Peanut®, Bluetooth®, Zigbee®, Wi-Fi, RF radio) and antennae 710, for sending and receiving, coupled to each other and/or to the processor 701. The transceivers 708 and antennae 710 may be used with the above-mentioned circuitry to implement the various wireless transmission protocol stacks and interfaces. The smartphone computing device 102 may include a cellular network wireless modem chip 716 that enables communication via a cellular network and is coupled to the processor. The smartphone computing device 102 may include a peripheral device connection interface 718 coupled to the processor 701. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown). The smartphone computing device 102 may also include speakers 714 for providing audio outputs. The smartphone computing device 102 may also include a housing 720, constructed of a plastic, metal, or a combination of materials, for containing all or some of the components discussed herein. The smartphone computing device 102 may include a power source 722 coupled to the processor 701, such as a disposable or rechargeable battery. The rechargeable battery may also be coupled to the peripheral device connection port to receive a charging current from a source external to the smartphone computing device 102. Additionally, the smartphone computing device 102 may include a GPS receiver chip 754 coupled to the processor 701 as well as various sensors coupled to the processor 701, such as a microphone 752, a camera 753, and an accelerometer 755.

Figure 8:
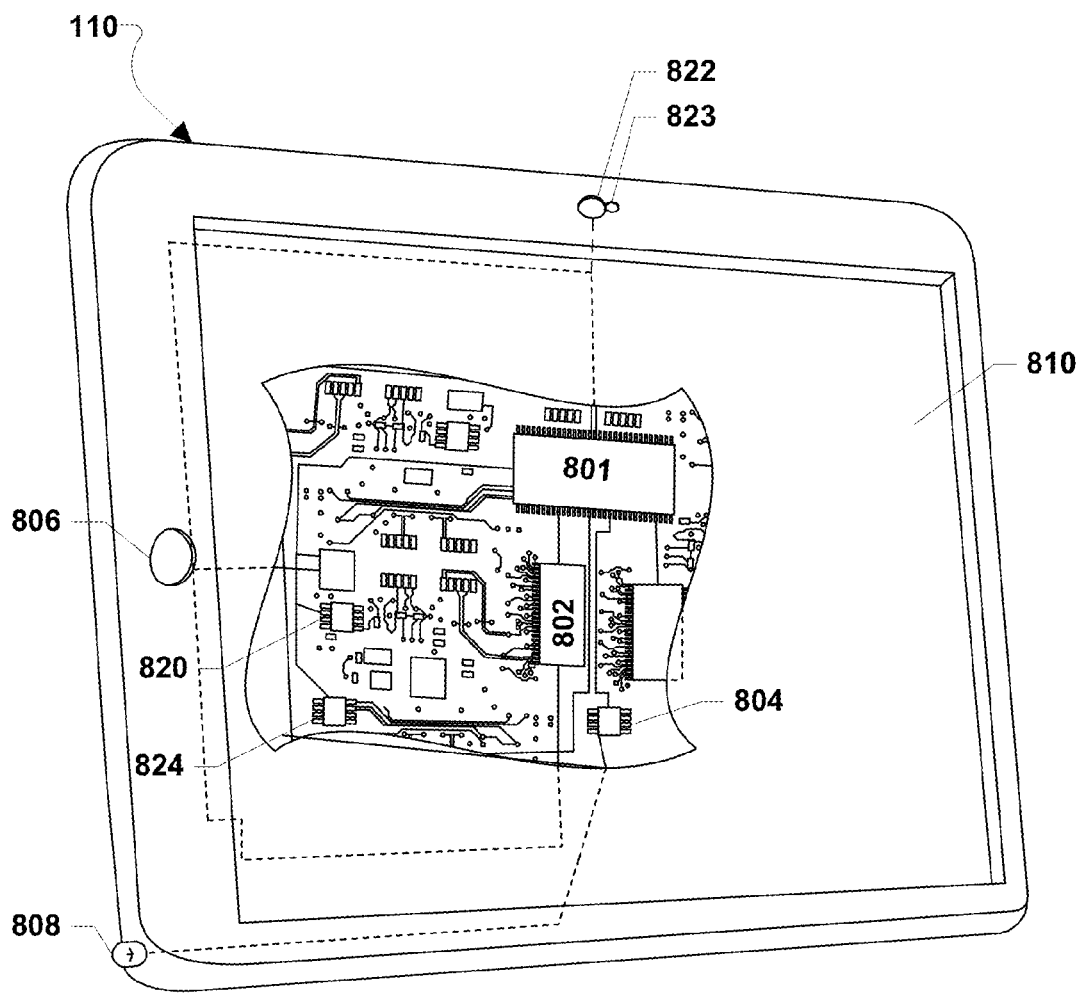
FIG. 8 is a component block diagram of a tablet computing device suitable for use with the various embodiments.

The various embodiments may be implemented in any of a variety of tablet computing devices, an example of which is illustrated in FIG. 8. For example, the tablet computing device 110 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet computing device 110 may have one or more radio signal transceivers 804 (e.g., Peanut, Bluetooth, Zigbee, WiFi, RF radio) and antennas 808 for sending and receiving wireless signals as described herein. The transceivers 804 and antennas 808 may be used with the above-mentioned circuitry to implement the various wireless transmission protocol stacks and interfaces. The tablet computing device 110 may include a cellular network wireless modem chip 820 that enables communication via a cellular network. The tablet computing device 110 may also include a physical button 806 for receiving user inputs. The tablet computing device 110 may also include various sensors coupled to the processor 801, such as a camera 822, a microphone 823, and an accelerometer 824.

Figure 9:
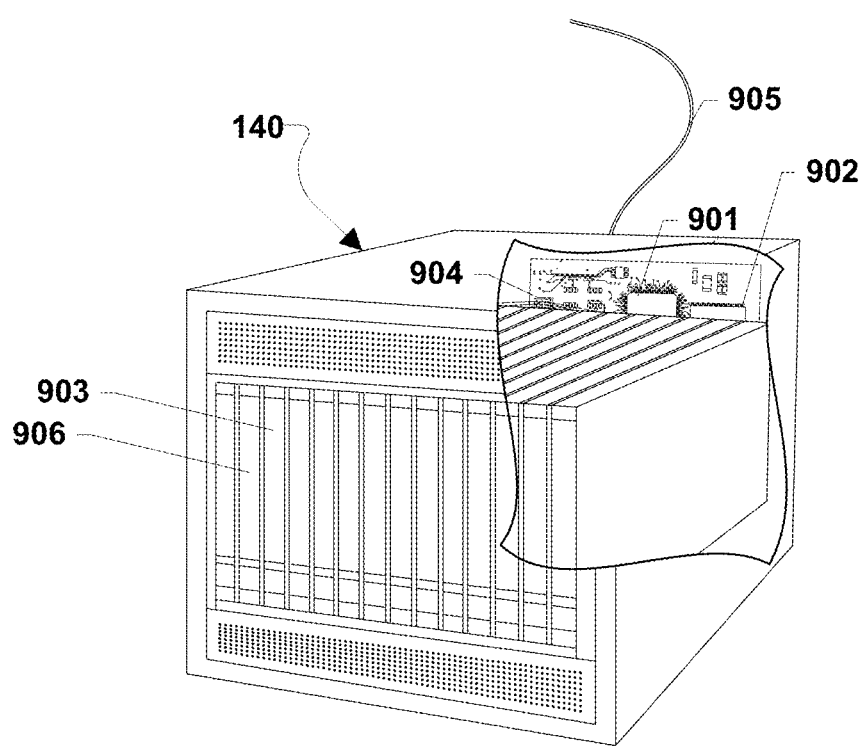
FIG. 9 is a component block diagram of a VOIP application server suitable for use in various embodiments.

The various embodiments may be implemented on any of a variety of commercially available servers, such as the VOIP application server 140 illustrated in FIG. 9. Such a VOIP application server 140 may typically include a processor 901 coupled to volatile memory 902 and a large capacity nonvolatile memory, such as a disk drive 903. The VOIP application server 140 may also include a floppy disc drive, compact disc (CD) or DVD disc drive 906 coupled to the processor 901. The VOIP application server 140 may also include network access ports 904 coupled to the processor 901 for establishing data connections with a network 905, such as a local area network coupled to other broadcast system computers and VOIP application servers.

The processors 701, 801, and 901 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 702, 802, and 902 before they are accessed and loaded into the processors 701, 801, and 901. The processors 701, 801, and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 701, 801, and 901 including internal memory or removable memory plugged into the various devices and memory within the processors 701, 801, and 901.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory processor-readable, computer-readable or server-readable medium. The operations of a method or algorithm disclosed herein may be embodied in a processor-executable software module or stored processor-executable instructions which may reside on a non-transitory computer-readable storage medium, a non-transitory server-readable storage medium, and/or a non-transitory processor-readable storage medium. Non-transitory computer-readable, server-readable, and/or processor-readable storage media may be any available media that may be accessed by a computer or processor of a computing device. By way of example, and not limitation, such non-transitory computer-readable, server-readable, and/or processor-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable, server-readable, and/or processor-readable media. Additionally, the operations of a method or algorithm may reside as one or any combination or set of codes and/or instructions on a tangible, non-transitory computer-readable, server-readable, and/or processor-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a VOIP application server associated with a VOIP application to improve performance of a target computing device for IP communications via the VOIP application, comprising:
   determining, by the VOIP application server, whether the target computing device is likely to be called using the VOIP application during a contact period;
   directing, by the VOIP application server, the target computing device to adjust a performance setting for receiving an IP communication with the VOIP application in response to determining a likelihood the target computing device will be called using the VOIP application during the contact period;
   determining, by the VOIP application server, whether an acknowledgement is received that indicates that the target computing device has adjusted the performance setting for receiving the IP communication with the VOIP application in response to the VOIP application server directing the target computing device to adjust the performance setting; and
   transmitting, by the VOIP application server, an out-of-band push notification message to the target computing device directing the target computing device to adjust the performance setting for receiving the IP communication with the VOIP application in response to determining that the acknowledgement was not received by the VOIP application server.

2. The method of claim 1, wherein directing, by the VOIP application server, the target computing device to adjust the performance setting for receiving the IP communication with the VOIP application in response to determining the likelihood the target computing device will be called using the VOIP application during the contact period comprises:
   directing, by the VOIP application server, the target computing device to raise the performance setting for receiving the IP communication with the VOIP application in response to determining that the target computing device is likely to be called using the VOIP application.

3. The method of claim 2, wherein directing, by the VOIP application server, the target computing device to raise the performance setting for receiving the IP communication with the VOIP application in response to determining that the target computing device is likely to be called using the VOIP application comprises at least one of:
   transmitting, by the VOIP application server via the VOIP application, dummy traffic to the target computing device;
   activating, by the VOIP application server, a quality-of-service (QoS) on an Rx interface corresponding to the VOIP application and the target computing device; and
   transmitting, by the VOIP application server via the VOIP application, a message directing the target computing device to utilize an aggressive slot cycle index (SCI) setting or an aggressive discontinuous reception (DRX) setting.

4. The method of claim 1, wherein the acknowledgement is a response message sent by the target computing device via the VOIP application.

5. The method of claim 1, wherein transmitting, by the VOIP application server, the out-of-band push notification message to the target computing device directing the target computing device to adjust the performance setting for receiving the IP communication with the VOIP application in response to determining that the acknowledgement was not received by the VOIP application server comprises:
  transmitting, by the VOIP application server, the out-of-band push notification message with a payload that includes data indicating a quality-of-service, a slot cycle index setting, and/or a discontinuous reception setting.

6. The method of claim 1, wherein directing, by the VOIP application server, the target computing device to adjust the performance setting for receiving the IP communication with the VOIP application in response to determining the likelihood the target computing device will be called using the VOIP application during the contact period comprises directing, by the VOIP application server, the target computing device to lower the performance setting for receiving the IP communication with the VOIP application in response to determining that the target computing device is not likely to be called using the VOIP application, and
  wherein lowering the performance setting comprises activating a default performance setting or a conservative performance setting for receiving the IP communication with the VOIP application.

7. The method of claim 6, wherein directing, by the VOIP application server, the target computing device to lower the performance setting for receiving the IP communication with the VOIP application in response to determining that the target computing device is not likely to be called using the VOIP application comprises at least one of:
  deactivating, by the VOIP application server, a quality-of-service on a receiver interface corresponding to the VOIP application and the target computing device; and
  transmitting, by the VOIP application server via the VOIP application, a message directing the target computing device to utilize a default quality-of-service, a default slot cycle index (SCI) setting, or a default discontinuous reception (DRX) setting.

8. A server, comprising:
  means for determining whether a target computing device is likely to be called using a VOIP application associated with the server during a contact period;
  means for directing the target computing device to adjust a performance setting for receiving an IP communication with the VOIP application in response to determining a likelihood the target computing device will be called using the VOIP application during the contact period;
  means for determining whether an acknowledgement is received that indicates that the target computing device has adjusted the performance setting for receiving the IP communication with the VOIP application in response to the server directing the target computing device to adjust the performance setting; and
  means for transmitting an out-of-band push notification message to the target computing device directing the target computing device to adjust the performance setting for receiving the IP communication with the VOIP application in response to determining that the acknowledgement was not received by the server.

9. The server of claim 8, wherein means for directing the target computing device to adjust the performance setting for receiving the IP communication with the VOIP application in response to determining the likelihood the target computing device will be called using the VOIP application during the contact period comprises:
  means for directing the target computing device to raise the performance setting for receiving the IP communication with the VOIP application in response to determining that the target computing device is likely to be called using the VOIP application.

10. The server of claim 9, wherein means for directing the target computing device to raise the performance setting for receiving the IP communication with the VOIP application in response to determining that the target computing device is likely to be called using the VOIP application comprises at least one of:
  means for transmitting, via the VOIP application, dummy traffic to the target computing device;
  means for activating a quality-of-service (QoS) on an Rx interface corresponding to the VOIP application and the target computing device; and
  means for transmitting, via the VOIP application, a message directing the target computing device to utilize an aggressive slot cycle index (SCI) setting or an aggressive discontinuous reception (DRX) setting.

11. The server of claim 8, wherein the acknowledgement is a response message sent by the target computing device via the VOIP application.

12. The server of claim 8, wherein means for transmitting the out-of-band push notification message to the target computing device directing the target computing device to adjust the performance setting for receiving the IP communication with the VOIP application in response to determining that the acknowledgement was not received by the server comprises:
  means for transmitting the out-of-band push notification message with a payload that includes data indicating a quality-of-service, a slot cycle index setting, and/or a discontinuous reception setting.

13. The server of claim 8, wherein directing the target computing device to adjust the performance setting for receiving the IP communication with the VOIP application in response to determining the likelihood the target computing device will be called using the VOIP application during the contact period comprises means for directing the target computing device to lower the performance setting for receiving the IP communication with the VOIP application in response to determining that the target computing device is not likely to be called using the VOIP application, and
  wherein lowering the performance setting comprises activating a default performance setting or a conservative performance setting for receiving the IP communication with the VOIP application.

14. The server of claim 13, wherein means for directing the target computing device to lower the performance setting for receiving the IP communication with the VOIP application in response to determining that the target computing device is not likely to be called using the VOIP application comprises at least one of:
  means for deactivating a quality-of-service on a receiver interface corresponding to the VOIP application and the target computing device; and
  means for transmitting a message directing the target computing device to utilize a default quality-of-service, a default slot cycle index (SCI) setting, or a default discontinuous reception (DRX) setting.

15. A server, configured with server-executable instructions to perform operations comprising:
  determining whether a target computing device is likely to be called using a VOIP application associated with the server during a contact period;
  directing the target computing device to adjust a performance setting for receiving an IP communication with the VOIP application in response to determining a likelihood the target computing device will be called using the VOIP application during the contact period
  determining whether an acknowledgement is received that indicates that the target computing device has adjusted the performance setting for receiving the IP communication with the VOIP application in response to the server directing the target computing device to adjust the performance setting; and transmitting an out-of-band push notification message to the target computing device directing the target computing device to adjust the performance setting for receiving the IP communication with the VOIP application in response to determining that the acknowledgement was not received by the server.

16. The server of claim 15, wherein the server is configured with server-executable instructions to perform operations such that directing the target computing device to adjust the performance setting for receiving the IP communication with the VOIP application in response to determining the likelihood the target computing device will be called using the VOIP application during the contact period comprises:

directing the target computing device to raise the performance setting for receiving the IP communication with the VOIP application in response to determining that the target computing device is likely to be called using the VOIP application.

17. The server of claim 16, wherein the server is configured with server-executable instructions to perform operations such that directing the target computing device to raise the performance setting for receiving the IP communication with the VOIP application in response to determining that the target computing device is likely to be called using the VOIP application comprises at least one of:

transmitting, via the VOIP application, dummy traffic to the target computing device;

activating a quality-of-service (QoS) on an Rx interface corresponding to the VOIP application and the target computing device; and transmitting, via the VOIP application, a message directing the target computing device to utilize an aggressive slot cycle index (SCI) setting or an aggressive discontinuous reception (DRX) setting.

18. The server of claim 15, wherein the acknowledgement is a response message sent by the target computing device via the VOIP application.

19. The server of claim 15, wherein the server is configured with server-executable instructions to perform operations such that transmitting the out-of-band push notification message to the target computing device directing the target computing device to adjust the performance setting for receiving the IP communication with the VOIP application in response to determining that the acknowledgement was not received by the server comprises:

transmitting the out-of-band push notification message with a payload that includes data indicating a quality-of-service, a slot cycle index setting, and/or a discontinuous reception setting.

20. The server of claim 15, wherein the server is configured with server-executable instructions to perform operations such that directing the target computing device to adjust the performance setting for receiving the IP communication with the VOIP application in response to determining the likelihood the target computing device will be called using the VOIP application during the contact period comprises directing the target computing device to lower the performance setting for receiving the IP communication with the VOIP application in response to determining that the target computing device is not likely to be called using the VOIP application, and wherein lowering the performance setting comprises activating a default performance setting or a conservative performance setting for receiving the IP communication with the VOIP application.

21. The server of claim 20, wherein the server is configured with server-executable instructions to perform operations such that directing the target computing device to lower the performance setting for receiving the IP communication with the VOIP application in response to determining that the target computing device is not likely to be called using the VOIP application comprises at least one of:

deactivating a quality-of-service on a receiver interface corresponding to the VOIP application and the target computing device; and transmitting a message directing the target computing device to utilize a default quality-of-service, a default slot cycle index (SCI) setting, or a default discontinuous reception (DRX) setting.

22. A non-transitory server-readable storage medium having stored thereon server-executable instructions configured to cause a server to perform operations comprising:

determining whether a target computing device is likely to be called using a VOIP application associated with the server during a contact period;

directing the target computing device to adjust a performance setting for receiving an IP communication with the VOIP application in response to determining a likelihood the target computing device will be called using the VOIP application during the contact period;

determining whether an acknowledgement is received that indicates that the target computing device has adjusted the performance setting for receiving the IP communication with the VOIP application in response to the server directing the target computing device to adjust the performance setting; and transmitting an out-of-band push notification message to the target computing device directing the target computing device to adjust the performance setting for receiving the IP communication with the VOIP application in response to determining that the acknowledgement was not received by the server.

23. The non-transitory server-readable storage medium of claim 22, wherein the stored server-executable instructions are configured to cause the server to perform operations such that directing the target computing device to adjust the performance setting for receiving the IP communication with the VOIP application in response to determining the likelihood the target computing device will be called using the VOIP application during the contact period comprises:

directing the target computing device to raise the performance setting for receiving the IP communication with the VOIP application in response to determining that the target computing device is likely to be called using the VOIP application.

24. The non-transitory server-readable storage medium of claim 23, wherein the stored server-executable instructions are configured to cause the server to perform operations such that directing the target computing device to raise the performance setting for receiving the IP communication with the VOIP application in response to determining that the target computing device is likely to be called using the VOIP application comprises at least one of:

transmitting, via the VOIP application, dummy traffic to the target computing device;

activating a quality-of-service (QoS) on an Rx interface corresponding to the VOIP application and the target computing device; and transmitting, via the VOIP application, a message directing the target computing device to utilize an aggressive slot cycle index (SCI) setting or an aggressive discontinuous reception (DRX) setting.

25. The non-transitory server-readable storage medium of claim 22, wherein the stored server-executable instructions are configured to cause the server to perform operations such that transmitting the out-of-band push notification message to the target computing device directing the target computing device to adjust the performance setting for receiving the IP communication with the VOIP application in response to determining that the acknowledgement was not received by the server comprises:
 transmitting the out-of-band push notification message with a payload that includes data indicating a quality-of-service, a slot cycle index setting, and/or a discontinuous reception setting.

26. The non-transitory server-readable storage medium of claim 22, wherein the stored server-executable instructions are configured to cause the server to perform operations such that directing the target computing device to adjust the performance setting for receiving the IP communication with the VOIP application in response to determining the likelihood the target computing device will be called using the VOIP application during the contact period comprises directing the target computing device to lower the performance setting for receiving the IP communication with the VOIP application in response to determining that the target computing device is not likely to be called using the VOIP application, and
 wherein lowering the performance setting comprises activating a default performance setting or a conservative performance setting for receiving the IP communication with the VOIP application.

* * * * *